(12) United States Patent
Yonezawa et al.

(10) Patent No.: US 7,758,030 B2
(45) Date of Patent: Jul. 20, 2010

(54) POSITIONING APPARATUS AND CLAMPING SYSTEM HAVING THE SAME

(75) Inventors: Keitaro Yonezawa, Kobe (JP); Yosuke Haruna, Kobe (JP)

(73) Assignee: Kosmek Ltd., Kobe-Shi, Hyogo (JP)

( * ) Notice: Subject to any disclaimer, the term of this patent is extended or adjusted under 35 U.S.C. 154(b) by 370 days.

(21) Appl. No.: 10/575,904

(22) PCT Filed: Oct. 4, 2004

(86) PCT No.: PCT/JP2004/014592
§ 371 (c)(1),
(2), (4) Date: Apr. 14, 2006

(87) PCT Pub. No.: WO2005/037485
PCT Pub. Date: Apr. 28, 2005

(65) Prior Publication Data
US 2007/0138725 A1   Jun. 21, 2007

(30) Foreign Application Priority Data
Oct. 20, 2003  (JP) .............................. 2003-358723

(51) Int. Cl.
*B23Q 3/00* (2006.01)
(52) U.S. Cl. .................................................. 269/309
(58) Field of Classification Search ............. 269/309,
269/310, 25, 32, 48.1, 50, 52; 279/2.12
See application file for complete search history.

(56) References Cited

U.S. PATENT DOCUMENTS

| 5,427,349 | A  | * | 6/1995 | Obrecht ................... 248/657 |
| 6,604,738 | B2 | * | 8/2003 | Haruna ..................... 269/309 |
| 2003/0160374 | A1 | * | 8/2003 | Yonezawa .................. 269/309 |
| 2004/0207141 | A1 | | 10/2004 | Kuroda |

FOREIGN PATENT DOCUMENTS

| JP | 57-27640 | 2/1982 |
| JP | 2003-260624 | 9/2003 |

\* cited by examiner

*Primary Examiner*—Hadi Shakeri
(74) *Attorney, Agent, or Firm*—Bacon & Thomas, PLLC

(57) ABSTRACT

A plug member (12) inserted into a positioning hole (5) formed in a second block (2) is projected from a first block (1). A plurality of slide portions (61) opposed to each other across the plug member (12) are arranged around the plug member (12) movably in a first radial direction (D1) substantially orthogonal to the opposed direction thereof. A first pressing member (15) and a second pressing member (19) are arranged outside the slide portions (61) diametrically expandably and diametrically contractibly and axially movably. The first pressing member (15) is driven toward a base end by a drive device, whereby the slide portions (61) expand the first pressing member (15) via the second pressing member (19), thereby the slide portions (61) are moved in the first radial direction (D1) with respect to the plug member (12). After the movement, when the second pressing member (19) is blocked from moving toward the base end, the first pressing member (15) strongly presses an inner peripheral surface of the positioning hole (5) in the second radial direction (D2).

11 Claims, 19 Drawing Sheets

POSITIONING APPARATUS AND CLAMPING SYSTEM HAVING THE SAME

TECHNICAL FIELD

The present invention relates to an apparatus for positioning a second block such as a work pallet with respect to a first block such as a table of a machine tool, also relates to a clamping system equipped with the positioning apparatus.

BACKGROUND OF THE INVENTION

Such a positioning apparatus is in general conventionally constructed so as to fit a plug projected from a support surface of a reference member (first block) into a circular positioning hole opened on a supported surface of a movable member (second block) (for example, refer to the following Patent Document 1).

Patent Document 1: Japanese Unexamined Patent Publication No. 57-27640

SUMMARY OF THE INVENTION

Problem to be Solved by the Invention

In the above-described prior art, it is necessary to provide a predetermined fitting gap between the positioning hole and the plug in order to attain a smooth fitting of them. Thereby, the gap will result in a decreased positioning accuracy.

The present invention has been made in view of the above problem, an object of which is to provide a positioning apparatus capable of conducting positioning with high accuracy.

Means for Solving the Problem and Effect

The problem to be solved by the present invention is as described above. Next, an explanation will be made for the means for solving the problem and the effect.

(First Invention)

A positioning apparatus of a first invention is constructed as follows as illustrated in FIG. 1 through FIG. 3, FIG. 10 or FIG. 11 for example.

A plug member 12 inserted into a positioning hole 5 formed in a second block 2 is projected from a first block 1. A plurality of slide portions 61, 61 opposed to each other across the plug member 12 are arranged around the plug member 12 movably in a first radial direction D1 substantially orthogonal to the opposed direction thereof. A first pressing member 15 is arranged outside the slide portions 61, 61 diametrically expandably and diametrically contractibly and axially movably within a predetermined range. A second pressing member 19 is arranged outside the slide portions 61, 61 and inside the first pressing member 15 diametrically expandably and diametrically contractibly and axially movably within a predetermined range. The first pressing member 15 or the second pressing member 19 is driven toward a base end by a drive means D, whereby the slide portions 61, 61 expand the first pressing member 15 in a second radial direction D2 different from the first radial direction D1, thereby the slide portions 61, 61 are moved in the first radial direction D1 with respect to the plug member 12.

According to the first invention, after the first pressing member 15 is inserted into the positioning hole 5, the fitting gap G (for example, refer to FIG. 4 and FIG. 5) can be eliminated by the drive means D to conduct positioning. Therefore, the first pressing member is smoothly inserted into the positioning hole and also positioned with high accuracy.

Further, positioning with high accuracy can be conducted in the second radial direction, and positional misalignment of the positioning hole to the plug member in the first radial direction is allowed, because the slide portions slide. When the first pressing member or the second pressing member whose axial movement is allowed within a predetermined range is prevented from moving toward the base end, the first pressing member is allowed to strongly press an inner peripheral surface of the positioning hole, thereby making it possible to accomplish positioning in the second radial direction with high accuracy.

(Second Invention)

In the first invention, it is preferable to provide the following construction, for example, as illustrated in FIG. 1 through FIG. 3, FIG. 10 or FIG. 11.

An inclined outer surface 13 is formed on the second pressing member 19. An inclined inner surface 17 allowed to make a tapering engagement with the inclined outer surface 13 is formed on the first pressing member 15. A drive member 21 is inserted into the plug member 12 axially movably, and the drive member 21 is connected to the first pressing member 15 or the second pressing member 19. The first pressing member 15 or the second pressing member 19 is moved toward the base end for locking via the drive member 21 so as to expand the first pressing member 15 in the second radial direction D2 by the tapering engagement and bring the first pressing member 15 into close contact with an inner peripheral surface of the positioning hole 5. The first pressing member 15 or the second pressing member 19 is moved toward a leading end for releasing via the drive member 21 so as to cancel the diametrically expanded condition of the first pressing member 15 and cancel the closely contacted condition.

According to the second invention, the second block is allowed to be positioned in the second radial direction with respect to the first block reliably and strongly by diametrically expanding force applied by the tapering engagement. Further, when the drive member is driven to move the first pressing member or the second pressing member for locking, the second block is allowed to be pressed against the first block via the first pressing member, thereby making it possible to omit an exclusive clamping means.

(Third Invention)

In the first invention, it is preferable to provide the following construction, for example, as illustrated in FIG. 1 through FIG. 3, FIG. 10 or FIG. 11.

An advancing means 69 which advances the first pressing member 15 or the second pressing member 19 toward a leading end is provided.

According to the third invention, during the locking movement, the first pressing member (or the second pressing member) attempts to move the second pressing member (or the first pressing member) toward a base end, to which the advancing means resists. Therefore, the first pressing member is smoothly expanded in a diametrically expanding direction. Further, the first pressing member which is in close contact with the positioning hole is allowed to move toward the base end against the advancing means by the diametrical expansion, thereby making it possible to strongly clamp the second block with respect to the first block.

(Fourth Invention)

A positioning apparatus of a fourth invention is constructed as follows, for example, as illustrated in FIG. 12 and FIG. 13, FIG. 14, FIG. 15 and FIG. 16, or FIG. 19.

A plug member 12 inserted into a positioning hole 5 formed in a second block 2 is projected from a first block 1. A plurality of slide portions 61, 61 opposed to each other across the plug member 12 are arranged around the plug member 12 movably in a first radial direction D1 substantially orthogonal to the opposed direction thereof and axially movably within a predetermined stroke. A pressing member 15 is arranged outside the slide portions 61, 61 diametrically expandably and diametrically contractibly and axially movably. The pressing member 15 is driven toward a base end by a drive means D, whereby the slide portions 61, 61 diametrically expand the pressing member 15 in a second radial direction D2 different from the first radial direction D1, thereby the slide portions 61, 61 are moved in the first radial direction D1 with respect to the plug member 12.

According to the fourth invention, after the pressing member 15 is inserted into the positioning hole 5, the fitting gap G (for example, refer to FIG. 12 and FIG. 13) is allowed to be eliminated by the drive means D to conduct positioning. Therefore, the pressing member is smoothly inserted into the positioning hole and also positioned with high accuracy. Further, positioning with high accuracy can be conducted in the second radial direction, and positional misalignment of the positioning hole to the plug member in the first radial direction is allowed, because the slide portions slide. It is noted that, when the slide portions whose axial movement is allowed within a predetermined stroke is prevented from moving toward the base end, the pressing member is allowed to strongly press an inner peripheral surface of the positioning hole, thereby making it possible to accomplish positioning in the second radial direction with high accuracy.

(Fifth Invention)

In the fourth invention, it is preferable to provide the following construction, for example, as illustrated in FIG. 12 and FIG. 13, FIG. 14, FIG. 15 and FIG. 16, or FIG. 19.

Inclined outer surfaces 13 are formed on the slide portions 61, 61. An inclined inner surface 17 allowed to make a tapering engagement with the inclined outer surfaces 13 is formed on the pressing member 15. A drive member 21 is inserted into the plug member 12 axially movably, and the drive member 21 is connected to the pressing member 15. The drive member 21 moves the pressing member 15 toward the base end for locking to expand the pressing member 15 in the second radial direction D2 by the tapering engagement and bring the pressing member 15 into close contact with an inner peripheral surface of the positioning hole 5. The drive member 21 moves the pressing member 15 toward a leading end for releasing to cancel the diametrically expanded condition of the pressing member 15 and cancel the closely contacted condition.

According to the fifth invention, it is possible to position the second block with respect to the first block in the second radial direction reliably and strongly by diametrically expanding force applied from the tapering engagement. Further, when the drive member is driven to move the pressing member for locking, the second block is allowed to be pressed against the first block via the pressing member, thereby making it possible also to omit an exclusive clamping means.

(Sixth Invention)

In the fourth invention, it is preferable to provide an advancing means 69 which advances the slide portions 61, 61 toward a leading end, for example, as illustrated in FIG. 12 and FIG. 13, FIG. 14, FIG. 15 and FIG. 16, or FIG. 19.

According to the sixth invention, during the locking movement, the pressing member attempts to move the slide portions toward the base end, to which the advancing means resists. Therefore, the pressing member is smoothly expanded diametrically. Further, by moving the pressing member which is in close contact with the positioning hole by the diametrical expansion toward the base end against the advancing means, it is possible to strongly clamp the second block with respect to the first block.

(Seventh Invention)

In the first invention or in the fourth invention, it is preferable that the first pressing member or pressing member 15 is formed into an annular shape, for example, as illustrated in FIG. 1 through FIG. 3, FIG. 10, FIG. 11, FIG. 12 and FIG. 13, or FIG. 14.

According to the seventh invention, it is structurally possible to prevent intrusion of foreign matter inside the first pressing member (or the pressing member) and also avoid troubles on the positioning apparatus resulting from the foreign matter.

(Eighth Invention)

In the seventh invention, it is preferable to provide the following construction, for example, as illustrated in FIG. 1 through FIG. 3, FIG. 10, FIG. 11, FIG. 12 and FIG. 13, or FIG. 14.

A slit 51 is formed in the first pressing member or pressing member 15, and the first pressing member or the pressing member 15 is allowed to deform in a diametrically expanding direction and a diametrically contracting direction by existence of the slit 51.

According to the eighth invention, such a mechanically simple construction is accomplished that the first pressing member (or the pressing member) is allowed to be deformed in a diametrically expanding direction and a diametrically contracting direction. Further, the first pressing member (or the pressing member) is allowed to be deformed to a larger amount in a radial direction, thereby making the fitting gap larger to smoothly insert the first pressing member (or the pressing member) into the positioning hole.

(Ninth Invention)

In the first invention, it is preferable that the second pressing member 19 is formed into an annular shape, for example, as illustrated in FIG. 1 through FIG. 3, FIG. 10, or FIG. 11.

According to the ninth invention, it is structurally possible to prevent intrusion of foreign matter inside the second pressing member and also avoid troubles on the positioning apparatus resulting from the foreign matter.

(Tenth Invention)

In the ninth invention, it is preferable to provide the following construction, for example, as illustrated in FIG. 1 through FIG. 3, FIG. 10, or FIG. 11.

A slit 57 is formed in the second pressing member 19, and the second pressing member 19 is allowed to deform in a diametrically expanding direction and a diametrically contracting direction by existence of the slit 57.

According to the ninth invention, such a simple construction is accomplished that the second pressing member is allowed to deform in a diametrically expanding direction and a diametrically contracting direction.

(Eleventh Invention)

In the ninth invention, it is preferable to provide the following construction, for example, as illustrated in FIG. 1 through FIG. 3.

Gaps A, A are formed between the second pressing member 19 and the plug member 12 in the first radial direction D1.

According to the eleventh invention, the first pressing member and second pressing member are movable in the first radial direction so as to smoothly absorb positional misalignment in the first radial direction occurring between the positioning hole and the plug member.

(Twelfth Invention)

In the first invention or the fourth invention, it is preferable to provide the following construction, for example, as illustrated in FIG. 15 and FIG. 16, or FIG. 19.

The first pressing member or the pressing member 15 is formed into a block shape and arranged so as to oppose each other across the slide portions 61, 61 in plurality.

According to the twelfth invention, the first pressing member (or the pressing member) does not deform in a diametrically expanding direction (the second radial direction) but simply undergoes a displacement to press the inner peripheral surface of the positioning hole. Therefore, the first pressing member (or the pressing member) is deformed to a larger range and allowed to be inserted into the positioning hole more smoothly.

(Thirteenth Invention)

In the twelfth invention, it is preferable to provide the following construction, for example, as illustrated in FIG. 18.

Two contact portions 61a, 61a allowed to come into contact with an inner surface of the first pressing member or pressing member 15 and escape portion 61b arranged between the two contact portions 61a, 61a are formed on an outer surface of each of the slide portions 61 circumferentially side by side. A gap C is formed between the escape portion 61b and the first pressing member or pressing member 15.

According to the thirteenth invention, the inner surface of the first pressing member (or the pressing member) is pushed at two contact portions for each of the slide portions but not pushed at the escape portion. Therefore, the inner surface of the first pressing member (or the pressing member) is brought into contact at two contact portions for one slide portion and, during the locking movement, the first pressing member (or the pressing member) is allowed to receive reaction force applied from the inner peripheral surface of the positioning hole at the two portions stably. It is, therefore, possible to correct appropriately and reliably positional misalignment in the second radial direction occurring between the positioning hole and the plug member.

(Fourteenth Invention)

In the twelfth invention, it is preferable to provide the following construction, for example, as illustrated in FIG. 18.

Two contact portions 15a, 15a and an escape portion 15b arranged between the two contact portions 15a, 15a are formed on an outer surface of each of the first pressing member or pressing member 15 circumferentially side by side. When the contact portions 15a, 15a come into contact with an inner peripheral surface of the positioning hole 5, a gap B is formed between the escape portion 15b and the inner peripheral surface of the positioning hole 5.

According to the fourteenth invention, the first pressing member (or the pressing member) is allowed to be appropriately positioned even in a case where the positioning hole has a larger inner diameter and the first pressing member (or the pressing member) is required to undergo a larger displacement so as to come into close contact with the inner peripheral surface of the positioning hole. Namely, the inner peripheral surface of the positioning hole is pushed at two contact portions for each of the first pressing members (or the pressing member), whereas not pushed at the escape portion. Therefore, diametrically expanding force (force in the second radial direction) is applied at two contact portions each for one first pressing member (or one pressing member) to correct positional misalignment in the second radial direction occurring between the positioning hole and the plug member appropriately and reliably.

(Fifteenth Invention)

In the twelfth invention, it is preferable to provide the following construction, for example, as illustrated in FIG. 15 and FIG. 16, or FIG. 19.

A cylindrical connecting member 81 is arranged around an outer periphery of the plug member 12. The first pressing member or pressing member 15 is supported on the connecting member 81 movably in the second radial direction D2.

According to the fifteenth invention, a simple construction is realized for supporting the first pressing member (or the pressing member) formed into a block shape. Further, the connecting member is driven by a drive means, by which the first pressing member (or the pressing member) is allowed to be easily moved for locking or releasing. In addition, the connecting member is formed into a cylindrical shape, thereby a construction is provided that intrusion of foreign matter inside of the connecting member is made difficult.

(Sixteenth Invention)

In the twelfth invention, it is preferable that a returning member 84 which applies diametrically contracting force to the first pressing member or pressing member 15 is provided, for example, as illustrated in FIG. 15 and FIG. 16, or FIG. 19.

According to the sixteenth invention, the first pressing member (or the pressing member) formed into a block shape is allowed to easily return to a non diametrically-expanded condition.

(Seventeenth Invention)

In the first invention or the fourth invention, it is preferable to provide the following construction, for example, as illustrated in FIG. 2, FIG. 10, FIG. 11, FIG. 12, FIG. 14, or FIG. 15.

The drive means D moves the second block 2 toward a base end via the first pressing member or pressing member 15 in such a condition that the first pressing member or pressing member 15 comes into close contact with an inner peripheral surface of the positioning hole 5, and presses a supported surface 2a of the second block 2 against a support surface 1a of the first block 1.

According to the seventeenth invention, the second block is allowed to be positioned in the second radial direction with respect to the first block and also to be restricted in the axial direction.

(Eighteenth Invention)

The clamping system of the present invention is provided with the clamping apparatus set forth in the first invention or the fourth invention.

According to the eighteenth invention, workability when attaching or detaching the first block and the second block is excellent and positioning can be conducted with high accuracy.

(Nineteenth Invention)

The clamping system of the present invention is constructed in such a way that a plurality of positioning apparatuses are provided, and at least one of them is the positioning apparatus as set forth in the first invention or the fourth invention.

According to the nineteenth invention, workability when attaching or detaching the first block and the second block is excellent and positioning can be conducted with high accuracy. Further, a clamping system which is allowed to conduct positioning in various modes is provided.

DESCRIPTION OF REFERENCE NUMERALS

Figure 1:
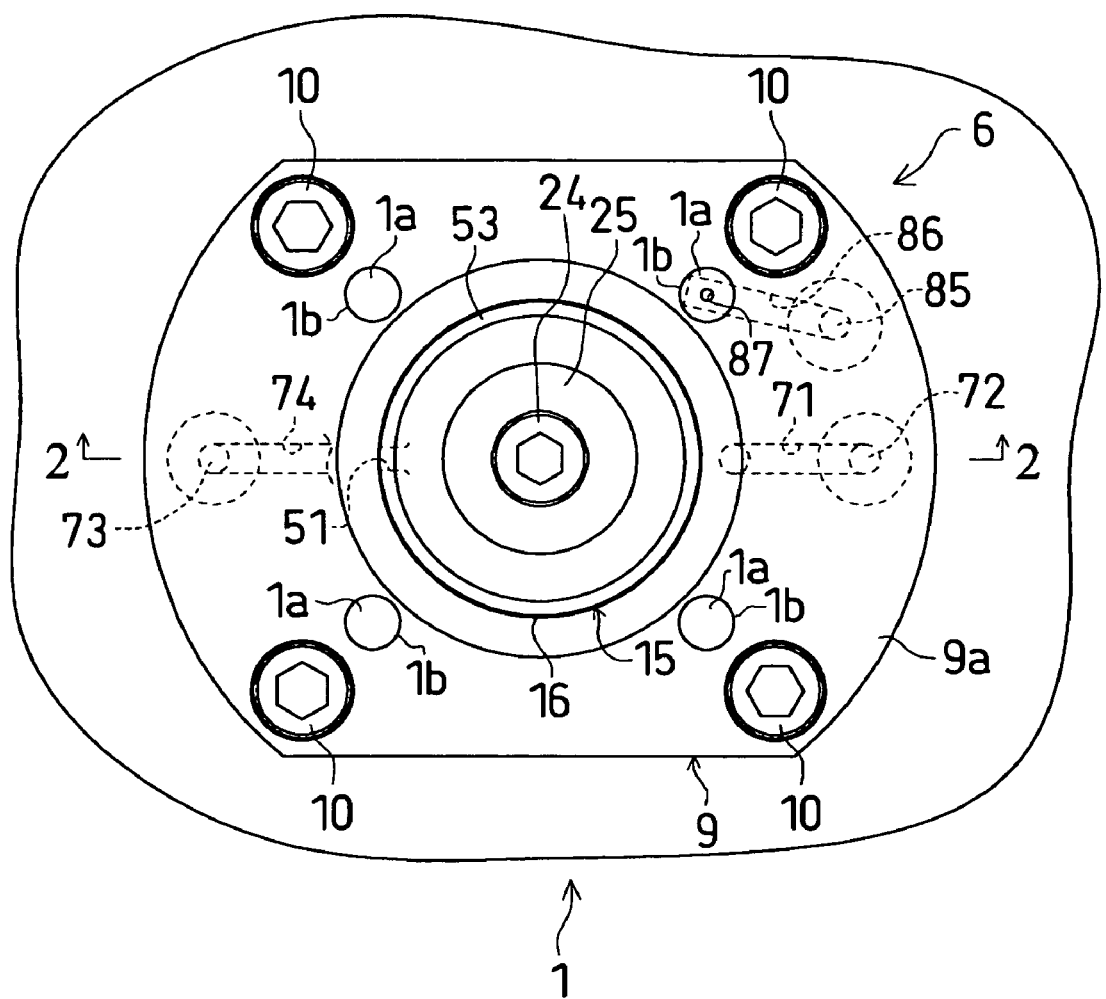
FIG. 1 is a plan view illustrating a plug means of a positioning apparatus according to a first embodiment of the present invention.

1: base plate (first block)
2: work pallet (second block)
5: positioning hole
12: plug member
13: inclined outer surface
15: sleeve member (first pressing member/pressing member), engaging member (pressing member)
17: inclined inner surface
19: wedge member (second pressing member)
21: drive member
61, 61: slide portions 69: coned disc spring, advance piston, coil spring (advancing means)
D: drive means
D1: first radial direction
D2: second radial direction

BEST MODE FOR CARRYING OUT THE INVENTION

First Embodiment

FIG. 1 through FIG. 8 illustrate a first embodiment of the present invention.

Figure 2:
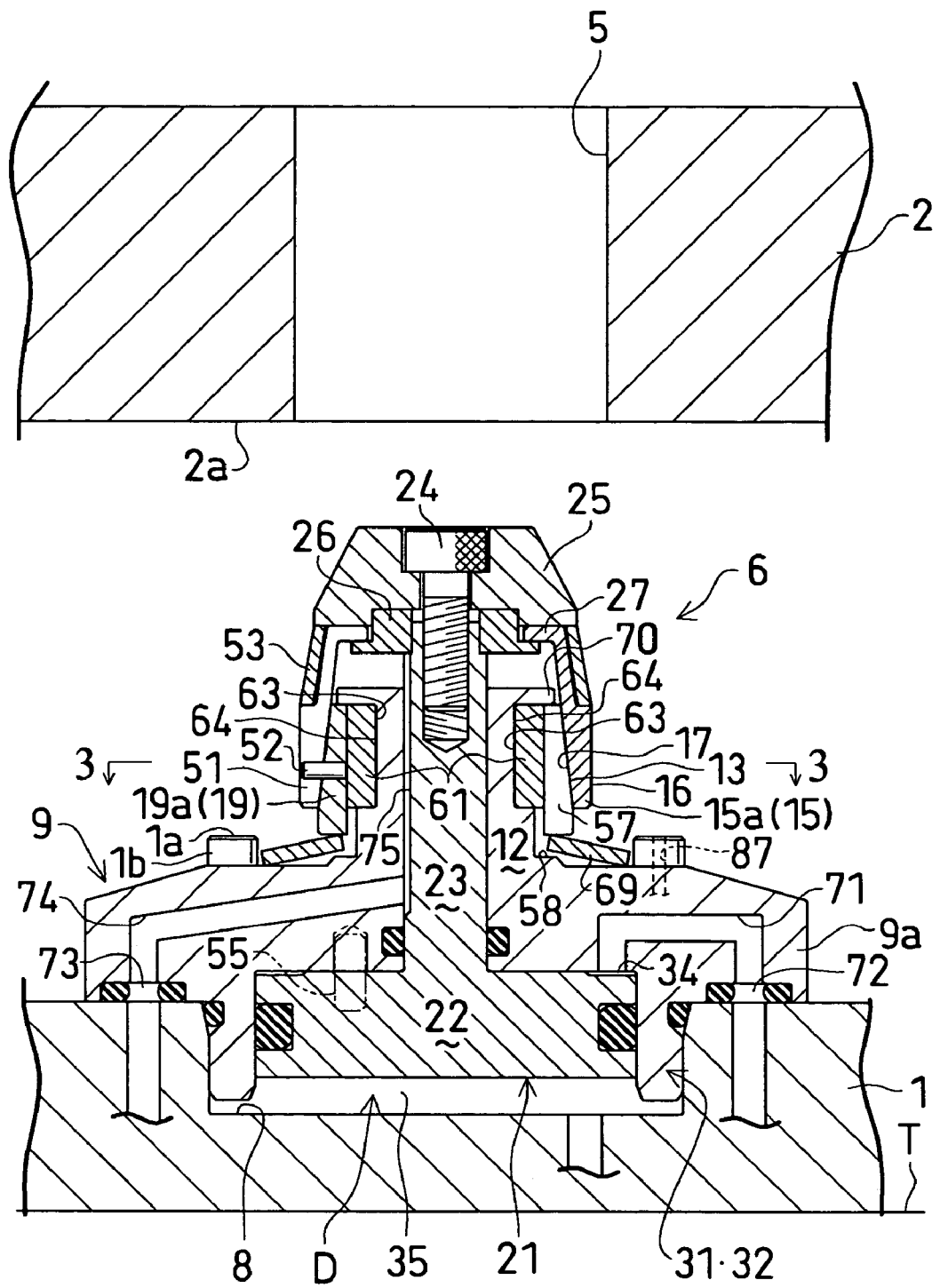
FIG. 2 is a cross sectional view indicated by the arrow 2-2 in FIG. 1.
Figure 3:
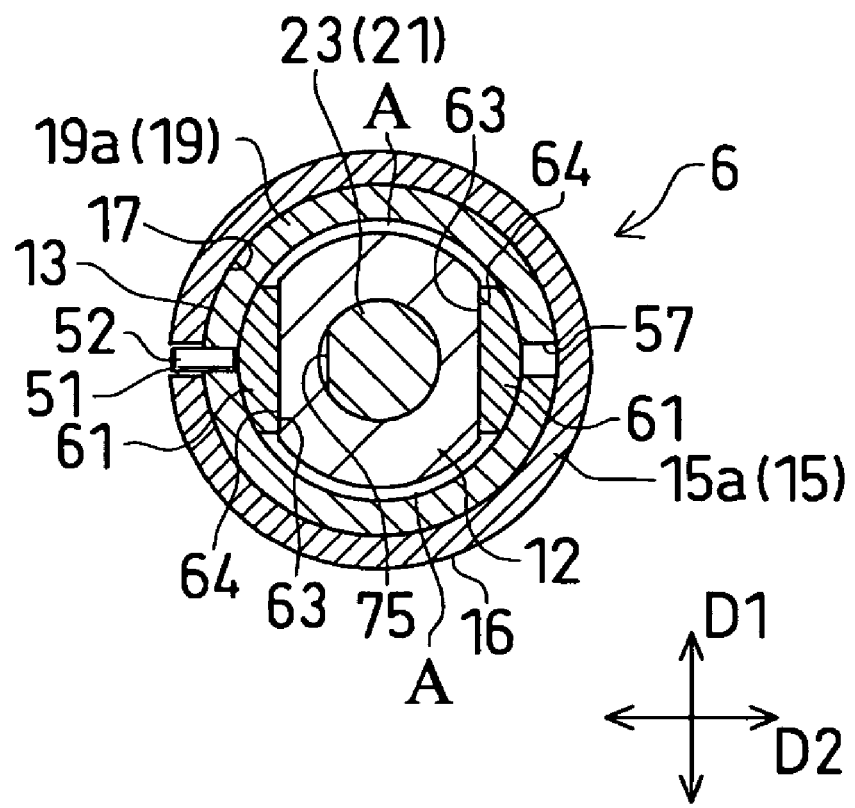
FIG. 3 is a cross sectional view indicated by the arrow 3-3 in FIG. 2.

First, an explanation will be made for a whole structure of a positioning apparatus of the present invention by referring to FIG. 1 through FIG. 3. FIG. 1 is a plan view of a plug means of the positioning apparatus. FIG. 2 is a view indicated by the arrow 2-2 in FIG. 1. FIG. 3 is a cross sectional view indicated by the arrow 3-3 in FIG. 2.

In the present embodiment, as illustrated in FIG. 2, a base plate 1 as a first block is placed and fixed to a table T of a machine tool. In the work pallet 2 as a second block is opened a circular positioning hole 5 in a penetrating manner. Corresponding to the positioning hole 5, on the base plate 1 is provided a plug means 6.

Hereinafter, an explanation will be made for construction of the plug means 6.

As illustrated in FIG. 2, in an upper surface of the base plate 1 is formed an installation hole 8. A housing 9 is fitted into the installation hole 8 in a precisely positioned condition. A flange 9a of the housing 9 is fixed to the base plate 1 by a plurality of tightening bolts 10 (refer to FIG. 1).

A plug member 12 is projected from the housing 9 upward (toward a leading end). The plug member 12 is allowed to be inserted into the positioning hole 5. An axis of the plug member 12 coincides with an axis of the installation hole 8.

On a periphery of the plug member 12 are projected a plurality of bosses 1b (in the present embodiment, four bosses 1b as illustrated in FIG. 1) from the flange 9a upward. On an upper end surface of the boss 1b is formed a flat support surface 1a. The positioning apparatus of the present embodiment is constructed in such a way that a supported surface 2a of the work pallet 2 as the second block is received by the support surface 1a of the base plate 1 and the work pallet 2 is positioned with respect to the base plate 1.

On an outer periphery of the plug member 12 is formed a pair of slide outer surfaces 64, 64 facing each other in a radical direction. The slide outer surfaces 64, 64 are formed into a vertical flat surface which is parallel to the axis of the plug member 12.

Outside the plug member 12 are provided a pair of slide portions 61, 61. The slide portions 61, 61 are arranged so as to oppose each other across the plug member 12 in a radial direction.

On inner surfaces of the respective slide portions 61, 61 are formed slide surfaces 63, 63. The slide surface 63 is also formed into a vertical flat surface which is parallel to the axis of the plug member 12, as with the slide outer surface 64. The slide portions 61, 61 are arranged in such a way that the slide surfaces 63, 63 come into contact with the slide outer surfaces 64, 64, and allowed to move toward a first radial direction (first diametrically direction) D1 given in FIG. 3, along the slide surfaces 63, 63. Additionally, outer surfaces of the respective slide portions 61, 61 are formed into an arc surface which is made straight vertically (straight outer surface).

An annular wedge member 19 (second pressing member) is arranged outside the slide portions 61, 61 and around an outer periphery of the plug member 12. An inner surface of the wedge member 19 comes into contact with the straight outer surface of the slide portions 61, 61. The inner surface of the wedge member 19 slides on the straight outer surface, by which the wedge member 19 is allowed to move axially within a predetermined movable stroke to be described later.

As illustrated in FIG. 3 and others, the wedge member 19 is formed into a collet shape. Namely, on a peripheral wall 19a of the wedge member 19 is provided one slit 57 extending axially and opened on both upper and lower ends. Thereby, a substantially whole part of the peripheral wall 19a which extends circumferentially is allowed to undergo an elastic deformation in a diametrically expanding direction and a diametrically contracting direction.

Further, over an entire outer periphery of the wedge member 19 is formed an inclined outer surface 13. The inclined outer surface 13 is constructed into a tapered shape so as to get closer to the axis upward (toward the leading end).

Additionally, between the wedge member 19 and the plug member 12 are formed gaps A, A in the first radial direction D1, as illustrated in FIG. 3.

Outside the wedge member 19 is arranged an annular sleeve member (first pressing member) 15. The sleeve member 15 is also formed into a collet shape, as with the wedge member 19. Namely, on a peripheral wall 15a of the sleeve member 15 is provided one slit 51 extending axially and opened on both upper and lower ends. Thereby, a substantially whole part of the peripheral wall 19a which extends circumferentially is allowed to undergo an elastic deformation in a diametrically expanding direction and a diametrically contracting direction. In addition, when the sleeve member 15 is released for diametrically expanding force thereof, the sleeve member 15 is allowed to return to a diametrically contracting direction by its own elastic restoring force.

Over an entire inner periphery of the sleeve member 15 is formed an inclined inner surface 17. The inclined inner surface 17 is formed into a tapered shape so as to get closer to the axis upward (toward the leading end). The inclined inner surface 17 is allowed to make a tapering engagement with the inclined outer surface 13 of the wedge member 19.

Over an entire outer periphery of the sleeve member 15 is formed a straight outer surface 16, which is allowed to come into close contact with the positioning hole 5.

In the sleeve member 15, the slit 51 is not limited to a single slit but may be available in plurality. For example, the slits 51 may be opened on both the upper and lower ends of the sleeve member 15 alternately and circumferentially. Similarly, in the wedge member 19, the slit 57 is not limited to a single slit but may be available in plurality.

A rotation stopper pin 52 is fixed to the wedge member 19, and an outer end of the rotation stopper pin 52 projecting in a radial direction is inserted into the slit 51 of the sleeve member 15. Consequently, rotation of the sleeve member 15 is prevented. Further, in this case, an elastic seal member (not illustrated) such as rubber is accommodated in the slit 51 by adhesion, packing or the like. However, the elastic seal member may be omitted, depending on an application of the positioning apparatus.

Into a cylindrical hole of the plug member 12 is inserted a drive member 21 vertically movably. As illustrated in FIG. 2, the drive member 21 is provided with a piston 22 inserted hermetically into a lower part of the housing 9, a piston rod 23 projected upward from the piston 22, a bolt 24 screwed onto an upper part of the piston rod 23, a cap member 25 fixed by the bolt 24, and a ring 26 attached between the cap member 25 and an upper end surface of the piston rod 23. Between the cap member 25 and the ring 26 is fitted an upper flange 27 of the sleeve member 15 horizontally movably.

A pin 55 is inserted into the piston 22, and the pin 55 is engaged with an engaging hole formed on the housing 9. As a result, rotation of the drive member 21 is blocked.

Inside the housing 9 are provided a lock means 31 and a release means 32 which construct the drive means D. The lock means 31 is constructed with a hydraulic chamber 34 provided for locking (hereinafter, referred to as a lock chamber) arranged above the piston 22 and with the piston 22. Further, the release means 32 is constructed with a hydraulic chamber 35 provided for releasing (hereinafter, referred to as a release chamber) provided below the piston 22 and with the piston 22.

The lock chamber 34 is communicatively connected with a lock port 72 formed at a lower surface of the flange 9a via an oil passage 71 formed inside the housing 9. Further, the release chamber 35 is communicatively connected with a bottom portion of the installation hole 8.

On the lower surface of the flange 9a is provided a blow port 73. The blow port 73 is communicatively connected with inside of the cylindrical hole of the plug member 12 via an air passage 74 formed inside the housing 9. Further, an outer peripheral surface of the piston rod 23 is notched to form a vertical passage 75, and the vertical passage 75 is communicatively connected with the air passage 74.

Then, when compressed air is supplied to the blow port 73, the compressed air is led via the air passage 74 and the vertical passage 75 to a space between an upper end surface of the plug member 12 and the ring 26, and discharged outside via the slit 51, the gap A and the like. Thereby, various portions such as the inclined outer surfaces 13, 13 and the inclined inner surface 17 are allowed to be cleaned.

Further, as illustrated in FIG. 1, on the lower surface of the flange 9a is provided a positioning detection port 85. The positioning detection port 85 is communicatively connected with a nozzle hole 87 opened in the support surface 1a of the boss 1b via an air passage 86 formed inside the housing 9.

When the supported surface 2a of the work pallet 2 comes into contact with the support surface 1a of the base plate 1 upon supply of compressed air to the positioning detection port 85, the nozzle hole 87 is closed by the supported surface 2a, thereby resulting in pressure rise of the positioning detection port 85. By detecting the pressure rise with a pressure sensor (not illustrated), it possible to detect whether or not the supported surface 2a is in contact with the support surface 1a.

As illustrated in FIG. 2, an annular shallow recess is formed on an upper part of the outer peripheral surface of the sleeve member 15, and an annular cover member 53 is fitted into the recess. The cover member 53 is formed in a circumferentially seamless manner, covering outside of an upper portion of the slit 51. An upper end surface of the cover member 53 is in contact with a lower end surface of the cap member 25. The cover member 53 acts to prevent intrusion of foreign matter such as metal swarf inside of the sleeve member 15.

Between the upper flange 27 of the sleeve member 15 and the ring 26 is formed an annular gap. The annular gap allows the sleeve member 15 to deform and move in a diametrically expanding direction and a diametrically contracting direction.

Below the wedge member 19 is arranged a coned disc spring 69 as an advancing means. The coned disc spring 69 exerts resilient force in the direction which allows the wedge member 19 to advance upward (toward the leading end). In other words, the coned disc spring 69 exerts force in the direction so as to tighten a tapering engagement between the inclined outer surface 13 and the inclined inner surface 17.

Additionally, the wedge member 19 is prevented from ascending to an amount exceeding the predetermined amount by being blocked by a flange 70 formed into an annular shape on an outer periphery of a leading end of the plug member 12. Accordingly, an upper end (leading end) of the movable stroke of the wedge member 19 is regulated.

Further, on an outer periphery of a lower end portion of the plug member 12 is 25 formed an annular projection 58. Then, when the wedge member 19 is lowered to compress the coned disc spring 69 in a predetermined amount, the coned disc spring 69 comes into contact with the projection 58, thereby preventing additional compression. Accordingly, a lower end (base end) of the movable stroke of the wedge member 19 is regulated.

An explanation will be made for operation of the positioning apparatus by referring to FIG. 2 and FIG. 3, and FIG. 4 through FIG. 8.

Figure 4:
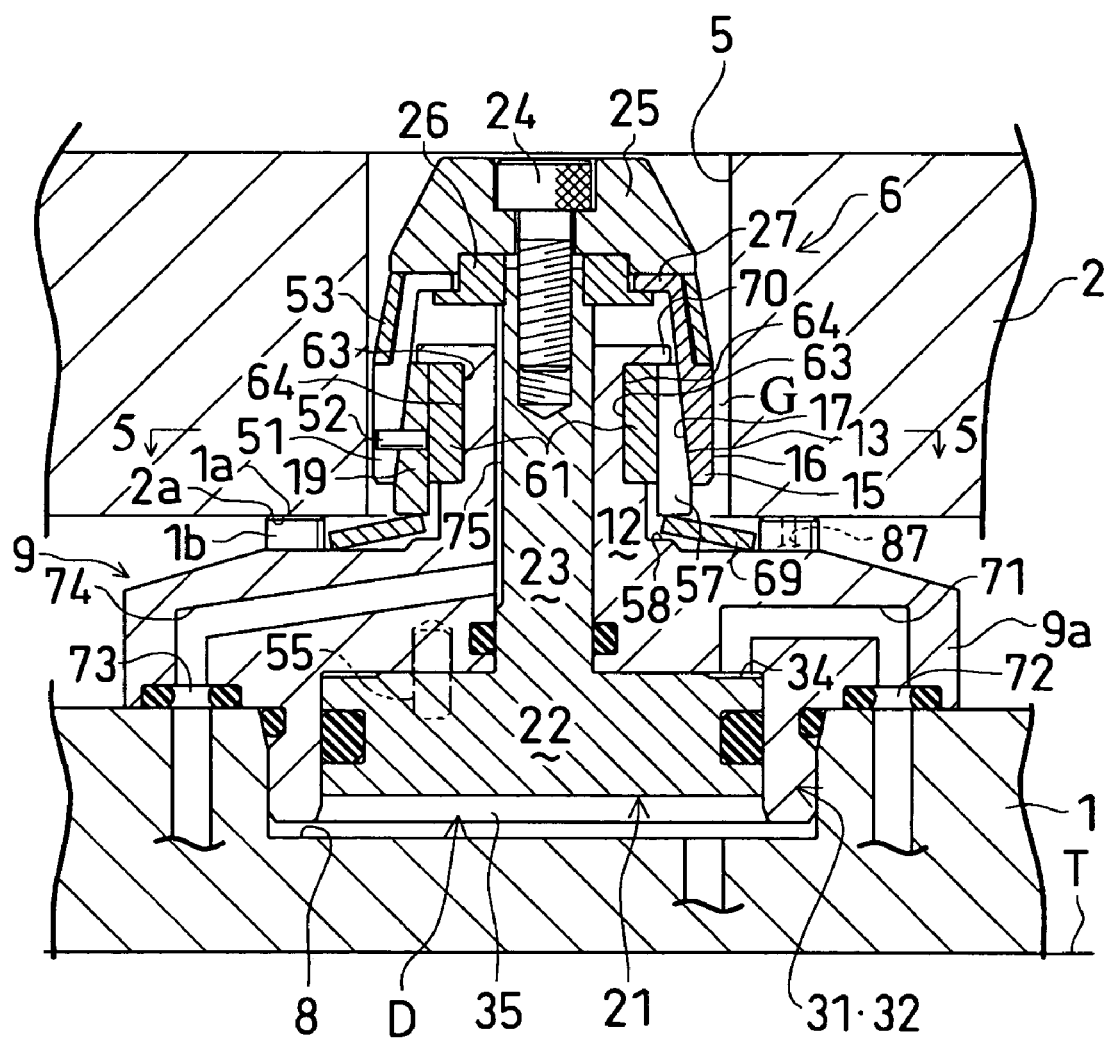
FIG. 4 is an elevational cross sectional view illustrating a state in which the plug means is inserted into a positioning hole.
Figure 5:
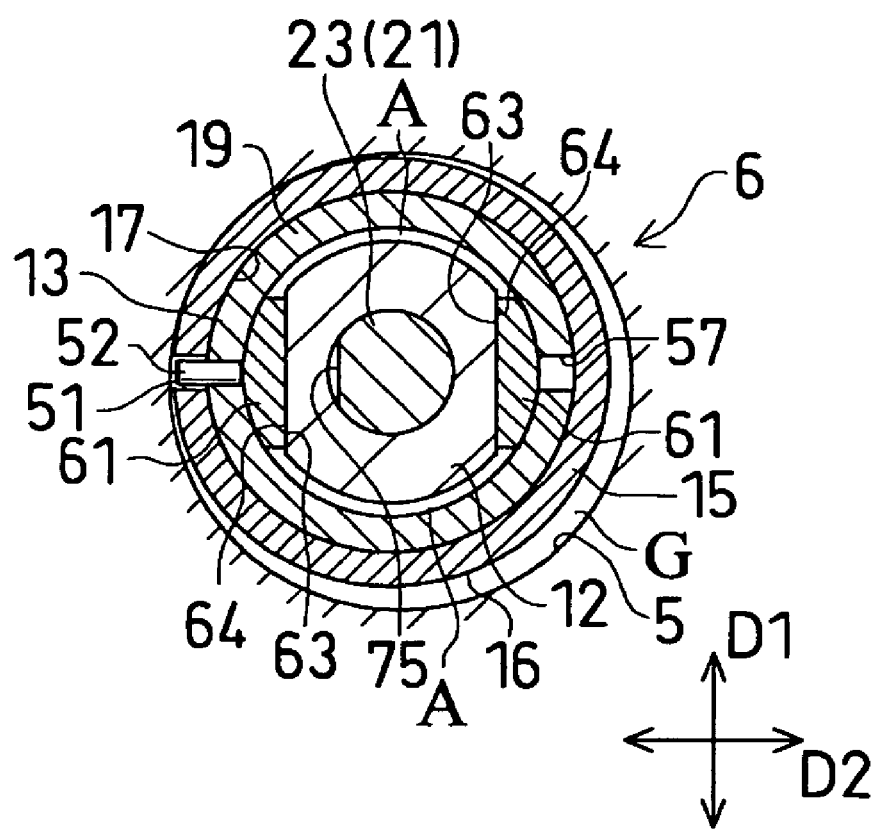
FIG. 5 is a cross sectional view indicated by the arrow 5-5 in FIG. 4.
Figure 6:
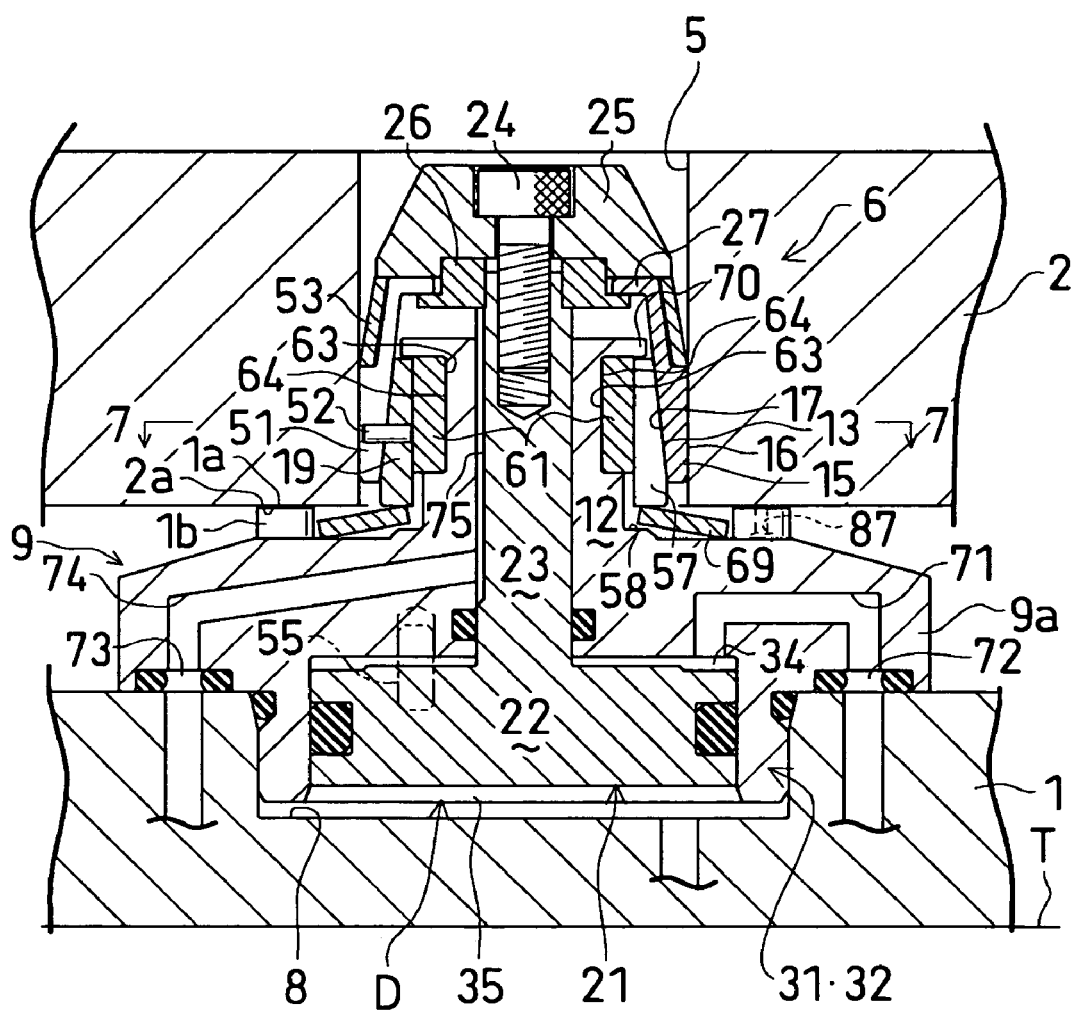
FIG. 6 is an elevational cross sectional view illustrating a state in which a sleeve member of the plug means diametrically expands to come into close contact with an inner peripheral surface of the positioning hole.
Figure 7:
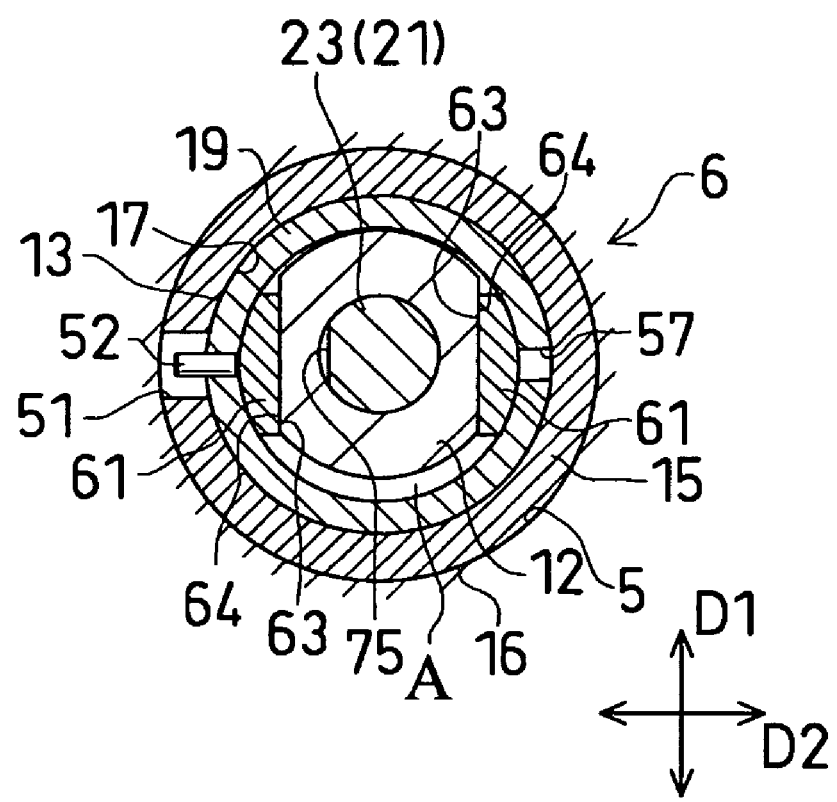
FIG. 7 is a cross sectional view indicated by the arrow 7-7 in FIG. 6.
Figure 8:
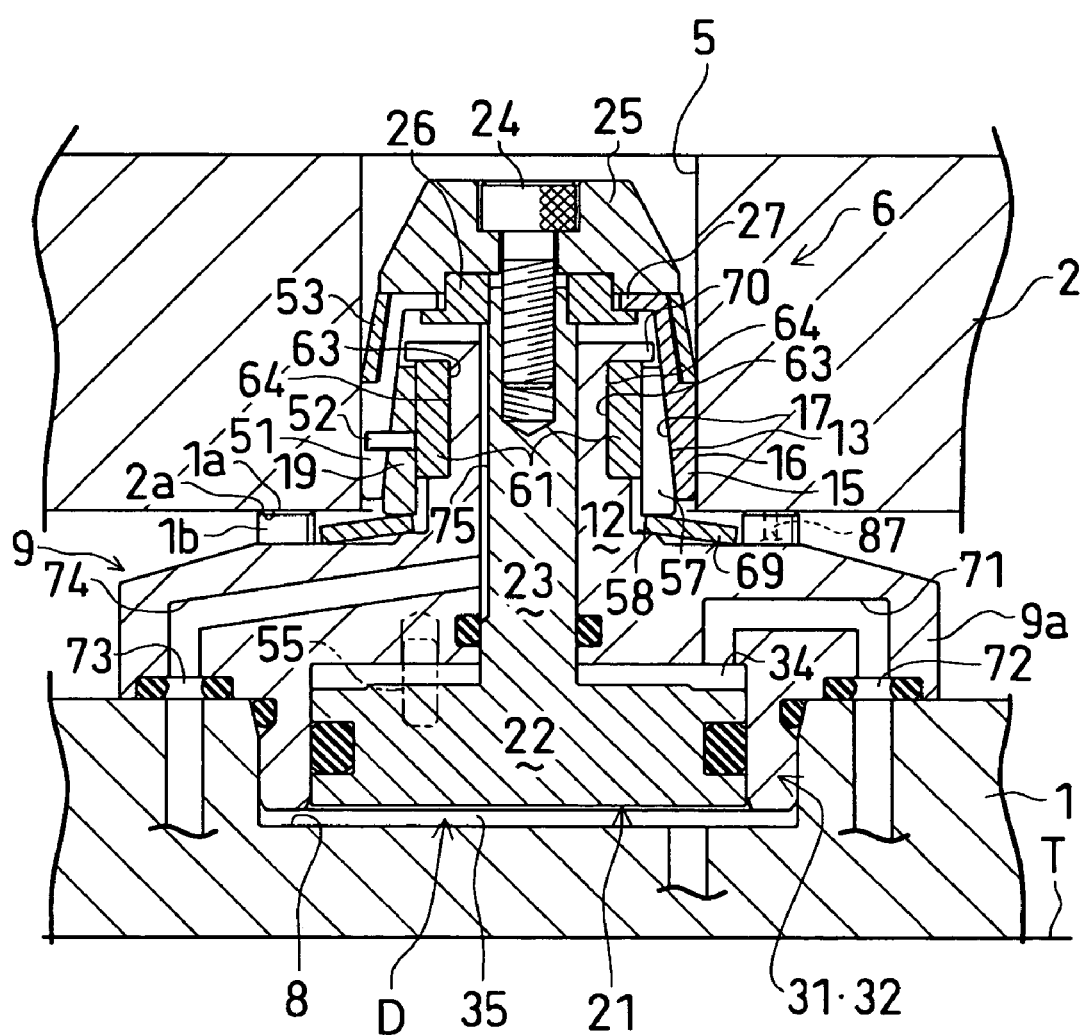
FIG. 8 is an elevational cross sectional view illustrating a state that the sleeve member strongly and diametrically expands.

FIG. 4 is an elevational cross sectional view illustrating a state in which the plug means 6 is inserted into the positioning hole 5. FIG. 5 is a cross sectional view indicated by the arrow 5-5 in FIG. 4. FIG. 6 is an elevational cross sectional view illustrating a state in which the sleeve member 15 diametrically expands to come into close contact with the inner peripheral surface of the positioning hole 5. FIG. 7 is a cross sectional view indicated by the arrow 7-7 in FIG. 6. FIG. 8 is an elevational cross sectional view illustrating a locked state.

In the released condition illustrated in FIG. 2 and FIG. 3, pressurized oil has been discharged from the lock chamber 34 and pressurized oil has been supplied to the release chamber 35. Thereby, the piston 22 has raised the piston rod 23 and the piston rod 23 has raised the sleeve member 15 via the bolt 24 and the ring 26. In this case, between the upper end surface of the plug member 12 and the lower surface of the ring 26 is formed a contact gap.

Further, the wedge member 19 is raised by the operation of the coned disc spring 69 and kept stationary at a position contacting with the flange 70 (at a position corresponding to an advanced end of the movable stroke) or at a position close thereto. In this condition, the inclined outer surface 13 of the wedge member 19 is opposed to the inclined inner surface 17 of the sleeve member 15 in a minute space or slightly makes a tapering engagement therewith. Therefore, the sleeve member 15 is in a condition completely free of elastic deformation in a diametrically expanding direction (in a condition of a minimum deformation, if any). Additionally, the condition of the sleeve member 15 is called a "non diametrically-expanded condition."

When the work pallet 2 is positioned with respect to the base plate 1, at first, as illustrated in FIG. 4, in the above-described released condition, the work pallet 2 is lowered and the straight outer surface 16 of the sleeve member 15 is inserted into the positioning hole 5. It is desirable that during the insertion, compressed air is supplied to the blow port 73, thereby blowing foreign matter attached on various portions such as the inner peripheral surface of the positioning hole 5 and cleaning them. Since the sleeve member 15 is in the non diametrically-expanded condition, as described previously, an annular fitting gap G is formed between the straight outer surface 16 inserted into the positioning hole 5 and the inner peripheral surface of the positioning hole 5.

Additionally, an explanation will be made hereinafter that, during the insertion, the axis of the positioning hole 5 is misaligned to the axis of the plug member 12, and also misaligned to the first radial direction D1 which is parallel to the slide surface 63 and a second radial direction (second diametrically direction) D2 which is perpendicular thereto, as illustrated in FIG. 5. The fitting gap G is an eccentric gap as illustrated in FIG. 5, as a result of the above axial misalignment.

Subsequently, the pressurized oil is discharged from the release chamber 35 and also pressurized oil is supplied via the lock port 72 to the lock chamber 34. Then, in the early stages of the pressurized oil supply, the piston 22 lowers the sleeve member 15 via the bolt 24 and the ring 26 by relatively low hydraulic pressure of the lock chamber 34. The sleeve member 15 pushes the wedge member 19 but the descent is resisted by the resilient force of the coned disc spring 69. As a result, the inclined inner surface 17 of the sleeve member 15 is wedge-engaged with the inclined outer surface 13 of the wedge member 19. Thereby, as illustrated in FIG. 6 and FIG. 7, the slide portions 61, 61 allow the sleeve member 15 to expand elastically via the wedge member 19 toward the second radial direction D2, thereby bringing the sleeve member 15 into close contact with the inner peripheral surface of the positioning hole 5. In the diametrically expanded and closely contacted condition of the sleeve member 15, the fitting gap G illustrated in FIG. 4 and FIG. 5 is eliminated.

More specifically, the sleeve member 15 allows diametrically expanding force to act upon the inner peripheral surface of the positioning hole 5 only at portions opposing the slide portions 61, 61, instead of the entire circumferential direction. Therefore, regarding positional misalignment of the positioning hole 5 with respect to the plug member 12 (the positional misalignment illustrated in FIG. 5), the positional misalignment in the second radial direction D2 is corrected by the close contact. On the other hand, the slide portions 61, 61 is movable in the first radial direction D1 along the slide surfaces 63, 63. Therefore, as illustrated in FIG. 7, the sleeve member 15 is allowed to move to some extent toward the first radial direction D1, together with the wedge member 19 and the slide portions 61, 61 by the component force of the first radial direction D1 of reaction force applied from the inner peripheral surface of the positioning hole 5, when the positioning hole 5 is pressed. Therefore, regarding positional misalignment of the positioning hole 5 with respect to the plug member 12, the positional misalignment in the first radial direction D1 is allowed. In other words, the plug means 6 conducts an accurate positioning in the direction at which slide portions 61, 61 oppose each other (the second radial direction D2) and allows positional misalignment in the direction orthogonal thereto (the first radial direction D1).

It follows that when pressure inside the lock chamber 34 is sufficiently increased, the sleeve member 15 in the closely contacted condition given in FIG. 6 is strongly driven by the drive member 21. Thereby, the sleeve member 15 compresses the coned disc spring 69 via the wedge member 19 and also descends, while rubbing and sliding on the positioning hole 5.

Therefore, the drive member 21 strongly lowers the work pallet 2 via the sleeve member 15, and the supported surface 2a of the work pallet 2 is strongly pressed against the support surface 1a of the base plate 1.

It is noted that, where a contact gap exists between the support surface 1a and the supported surface 2a, the sleeve member 15 in the closely contacted condition rubs and slides as described above after the contact gap is eliminated.

Next, as illustrated in the locked condition of FIG. 8, when the compressed coned disc spring 69 comes into contact with the projection 58, the wedge member 19 is received via the coned disc spring 69 by the housing 9, thereby preventing additional descent of the wedge member 19 (movement toward the base end). Therefore, descending force applied by the drive means D to the sleeve member 15 is substantially converted to diametrically expanding force of the sleeve member 15 by the inclined outer surface 13 and the inclined inner surface 17. The sleeve member 15 strongly presses the inner peripheral surface of the positioning hole 5 in the second radial direction D2, resulting in a strong positioning in the second radial direction D2.

Further, during the locking movement, the sleeve member 15 is prevented from descending to an amount exceeding a predetermined amount by a lower surface of the ring 26 which comes into contact with the upper end surface of the plug member 12.

When the locked condition as described above is changed to the released condition, the pressurized oil may be discharged from the lock chamber 34 and also pressurized oil may be supplied to the release chamber 35. Thereby, the sleeve member 15 ascends by the bolt 24 and the ring 26 (release movement), and the sleeve member 15 returns to the non diametrically-expanded condition by its own elastic restoring force, while releasing the tapering engagement with the wedge member 19, thereby the locked condition is released. Thereafter, the work pallet 2 is raised.

As explained above, in the present embodiment, positioning can be conducted by eliminating the fitting gap G (refer to FIG. 4 and FIG. 5) in the condition that the sleeve member 15 is inserted into the positioning hole 5. Therefore, it is possible to smoothly and easily insert the sleeve member 15 into the positioning hole 5 and at the same time positioning with high accuracy can be conducted.

Further, in a direction at which the slide portions 61, 61 oppose each other (the second radial direction D2), positioning with high accuracy can be conducted. In a direction parallel to the slide surface 63 (the first radial direction D1), positional misalignment of the positioning hole 5 to the plug member 12 can be allowed.

In addition, in the present embodiment, positional misalignment of the positioning hole 5 to the plug member 12 in the first radial direction D1 is smoothly absorbed by the slide portions 61, 61 which slide along the slide surface 63. A specific explanation will be made for effects thereof by comparison with a structural example given in FIG. 9.

Figure 9:
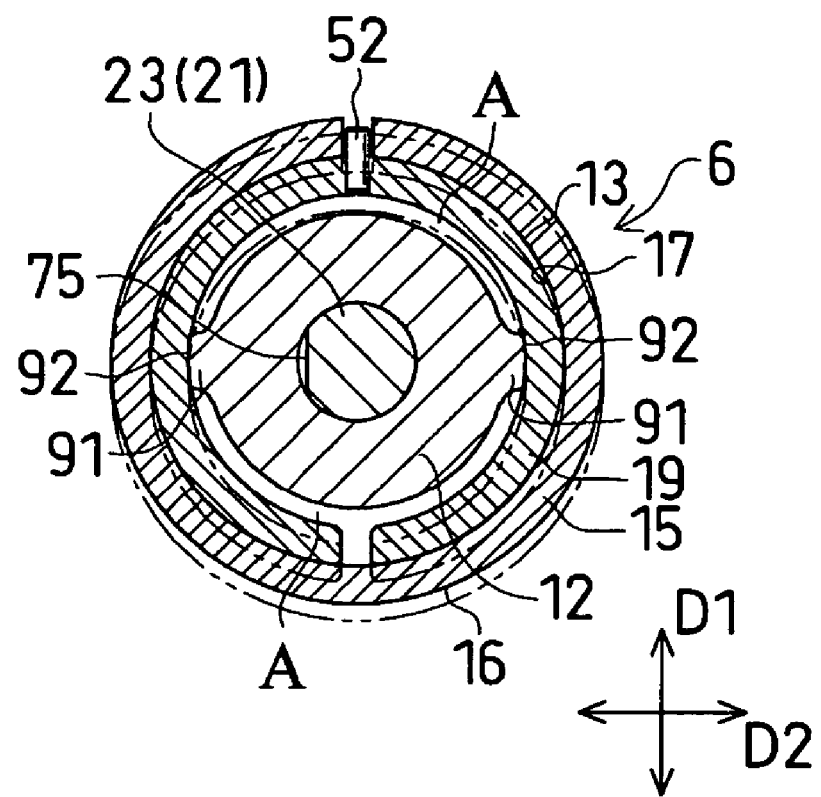
FIG. 9 is a comparative view explaining effects of the positioning apparatus, corresponding to FIG. 3.

Namely, a construction as given in FIG. 9 may be available as a construction wherein positioning with high accuracy is conducted in the second radial direction D2 and also positional misalignment is allowed in the first radial direction D1. FIG. 9 is a view illustrating a construction that the inventor proposed previously, corresponding to FIG. 3. In this case, instead of the slide portions 61, 61, projections 91, 91 projecting in the second radial direction D2 are formed on an outer peripheral surface of the plug member 12 so as to oppose each other in a radial direction. On these projections 91, 91 are formed straight outer surfaces 92, 92, and the inner peripheral surface of the wedge member 19 is in contact with the straight outer surfaces 92, 92. On the plug member 12 is formed an escape groove at a position between these projections 91, 91, as a result, between the wedge member 19 and the plug member 12 are formed gaps A, A in the first radial direction D1.

In the construction given in FIG. 9 as well, due to the locking movement of the sleeve member 15, positioning with high accuracy in the second radial direction D2 can be conducted, and also positional misalignment can be allowed in the first radial direction D1 orthogonal thereto since the sleeve member 15 and the wedge member 19 are allowed to be moved, as illustrated by the chain line.

However, in the construction given in FIG. 9, when the sleeve member 15 and the wedge member 19 move in the first radial direction D1, as illustrated by the chain line, with respect to the projections 91, 91, the straight outer surface 92 of the projection 91 comes into partial contact with the inner peripheral surface of the wedge member 19. Because a large friction occurs at the partially contacted portion, the sleeve member 15 and the wedge member 19 do not move smoothly in the first radial direction D1 with respect to the projections 91, 91. Further, when the sleeve member 15 moves in the first radial direction D1, lopsided force may be often locally applied to corners of the straight outer surface 92 of the projection 91 or to the inner peripheral surface of the wedge member 19. In particular, when external force in the second radial direction D2 is applied to the work pallet 2 in a positioned condition, excessive force is applied to the partially contacted portion, and damage such as an impression may be generated on the inner peripheral surface of the wedge member 19 or the straight outer surface 92. In order to prevent the harmful results, it is necessary to use high-quality materials such as special alloy steels or to provide proper hardening process for the materials, resulting in an increased production cost.

Further, in order to reduce harmful results resulting from the partial contact above, there is a case that the projections 91, 91 are made small to decrease a contact area between the straight outer surface 92 of the leading end surface and the inner peripheral surface of the wedge member 19. However, in this case, since force is transmitted only at a small area, the sleeve member 15 is unable to increase diametrically expanding force in the second radial direction D2. In addition, lowering force of the work pallet 2 cannot be secured sufficiently and reliably via the sleeve member 15.

In the construction of the present embodiment (refer to FIG. 7), however, where the sleeve member 15 is moved toward the first radial direction D1 in order to absorb positional misalignment in the first radial direction D1, the slide portions 61, 61 are also 25 moved accordingly. Therefore, the straight outer surfaces of the slide portions 61, 61 do not come into partial contact with the inner peripheral surface of the wedge member 19. Then, the straight outer surfaces of slide portions 61, 61 or the inner peripheral surface of the wedge member 19 is not damaged.

Further, in the construction of the present embodiment, even where a contact area is enlarged between the straight outer surface of the slide portion 61 and the inner peripheral surface of the wedge member 19, the sleeve member 15 and the wedge member 19 are moved smoothly along the slide surface 63, together with the slide portions 61, 61. Therefore, during the locking operation, the sleeve member 15 and the wedge member 19 follow positional misalignment in the first radial direction D1 and lo move smoothly while sliding, thereby making it possible to smoothly absorb the positional misalignment in the first radial direction D1. This fact means that a contact area is made larger between the straight outer surface of the slide portions 61 and the inner peripheral surface of the wedge member 19, and diametrically expanding force is made larger which is applied by the sleeve member 15 to the inner peripheral surface of the positioning hole 5. It also means that in a condition that the sleeve member 15 is in close contact with the inner peripheral surface of the positioning hole 5, lowering force of the work pallet 2 can be made larger.

In addition, in the present embodiment, the sleeve member 15 presses the inner peripheral surface of the positioning hole 5 more strongly in a condition given in FIG. 8 where the wedge member 19 is prevented from moving toward the lower end than in a condition given in FIG. 6. Therefore, an accurate positioning in the second radial direction D2 is accomplished.

Furthermore, in the present embodiment, the inclined outer surface 13 is formed on the wedge member 19 and the inclined inner surface 17 is formed on the sleeve member 15. Therefore, the second block 2 is allowed to be positioned in the second radial direction D2 with respect to the first block 1 more reliably and strongly by mechanical expanding force derived from the tapering engagement. When the drive member 21 is driven by the drive means D to move the sleeve member 15 for locking, the second block 2 is allowed to be pressed against the first block 1 via the sleeve member 15, thereby making it possible to omit an exclusive clamping means.

Moreover, in the present embodiment is provided the coned disc spring 69 which allows the wedge member 19 to advance to the leading end. Therefore, when the sleeve member 15 is moved to the base end for locking, the sleeve member 15 attempts to move the wedge member 19 to the base end, to which the resilient force of the coned disc spring 69 resists. Therefore, the sleeve member 15 is smoothly expanded diametrically by the tapering engagement.

Furthermore, in the present embodiment, the sleeve member 15 is formed into an annular shape. Therefore, intrusion of foreign matter such as swarf inside of the sleeve member 15 is made difficult.

In the present embodiment, the slit 51 is formed in the sleeve member 15. The sleeve member 15 is constructed so as to be deformable in a diametrically expanding and diametrically contracting direction by existence of the slit 51. Therefore, such a simple construction is realized that the sleeve member 15 is allowed to be deformed in the diametrically expanding and diametrically contracting direction. Further, as compared with a case where the sleeve member 15 is formed in a seamless manner, the sleeve member 15 is allowed to be deformed to a larger amount. Accordingly, since the fitting gap G (illustrated in FIG. 4 and FIG. 5) is made larger in the non diametrically-expanded condition, the straight outer surface 16 is effectively inserted into the positioning hole 5.

Further, in the present invention, the wedge member 19 is formed into an annular shape. Therefore, intrusion of foreign matter such as swarf inside of the wedge member 19 is made difficult.

In the present embodiment, the slit 57 is formed in the wedge member 19.

Then, the wedge member 19 is constructed so as to be deformable in a diametrically expanding and diametrically contracting direction by the slit 51. Therefore, such a simple construction is accomplished that the wedge member 15 is allowed to be deformed in the diametrically expanding and diametrically contracting direction.

Further, between the wedge member 19 and the plug member 12 are formed gaps A, A in the first radial direction D1. Therefore, during the locking movement, the sleeve member 15 and the wedge member 19 follow positional misalignment in the first radial direction D1 to move smoothly while sliding, thereby making it possible to smoothly absorb the positional misalignment in the first radial direction D1.

An explanation has been made for the first embodiment, which may be changed as illustrated in the following (1) through (7).

(1) The inclined outer surface 13 may be provided on an outer surface of another member arranged outside the wedge member 19, instead of being provided on the outer surface of the wedge member 19. Further, the slide outer surface 64 may be provided on an outer surface of another member arranged outside the plug member 12, instead of being provided on the outer surface of the plug member 12.

(2) Where a greater deformation is not necessary which allows the sleeve member 15 to expand diametrically for coming into close contact with the inner peripheral surface of the positioning hole 5, the slit 51 is not formed in the sleeve member 15 but the sleeve member 15 may be formed into an annularly seamless. Further, the slit 57 is not formed in the wedge member 19 but the wedge member 19 may be formed in an annularly seamless manner.

(3) Further, the wedge member 19 may be constructed as a plurality of divided members divided circumferentially. A pair of the slide portions 61, 61 may be connected via a thin member (not illustrated) extending along the respective gaps A, A, or may be formed integrally with the thin member.

(4) The drive member 21 is driven vertically by hydraulic pressure. However, it may be driven by supplying compressed air to the lock chamber 34 or the release chamber 35 for example. Further, the drive member 21 is not necessarily driven by a pressurized fluid but may be driven upward or downward by using a spring for example. The spring may include a compression coil spring and a single or a laminated coned disc spring.

(5) The plug means 6 may be inserted into the positioning hole 5 by raising the base plate 1, instead of lowering the work pallet 2. Further, a construction may be provided that the work pallet 2 is lowered and the base plate 1 is raised at the same time.

(6) In the work pallet 2 is formed the positioning hole 5 in a penetrating manner, however, the positioning hole 5 may be formed into such a shape so as to be opened only in the lower surface of the work pallet 2.

(7) The present embodiment may be constructed in such a way that the plug member 12 and the positioning hole 5 are arranged so that their axes are kept lateral and the plug means 6 is inserted into the positioning hole 5 horizontally. As a matter of course, the plug means 6 may be inserted thereinto in an oblique direction.

Then, with reference to FIG. 10 through FIG. 19, an explanation will be made for a plurality of embodiments and exemplary variations of the positioning apparatus in the present invention. In these other embodiments, the members which are the same or similar to those used in the first embodiment are in principle given the same reference numeral.

Second Embodiment

Figure 10:
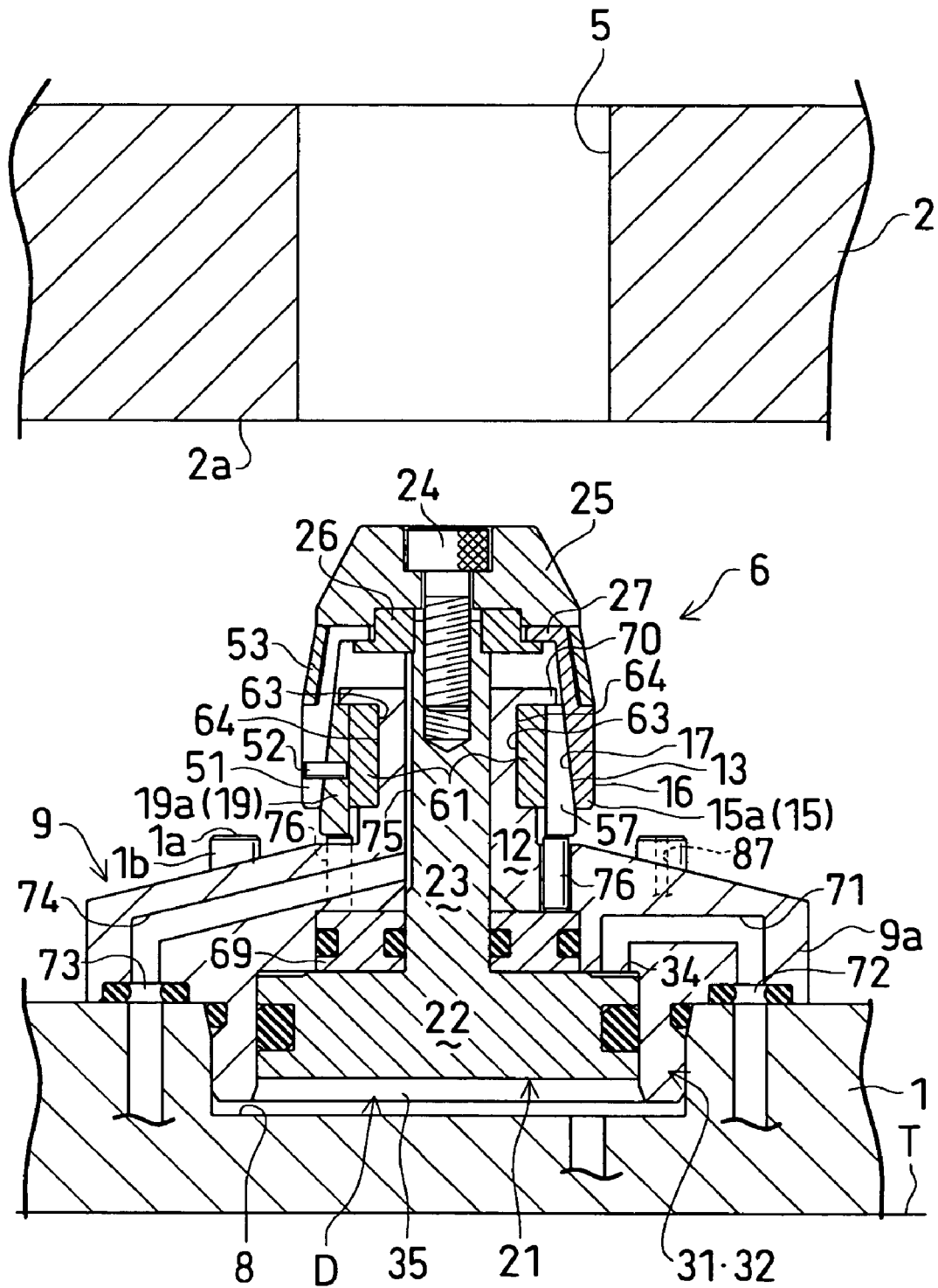
FIG. 10 is a view illustrating a second embodiment of the present invention and similar to FIG. 2.

FIG. 10 is a view illustrating a second embodiment of the positioning apparatus, corresponding to FIG. 2.

In the positioning apparatus of the second embodiment, as illustrated FIG. 10, the coned disc spring is omitted, but instead, an annular advance piston (advancing means) 69 is hermetically engaged with the housing 9 and the piston rod 23. The advance piston 69 is movable vertically (axially).

The advance piston 69 is driven upward by pressurized oil of the lock chamber 34. However, the pressure receiving area of the advance piston 69 is smaller than that of the piston 22 of the lock chamber 34.

A plurality of transmission pins 76 are supported on the housing 9 so as to be movable vertically (axially). A lower end of the transmission pin 76 is in contact with the advance piston 69, and an upper end thereof is in contact with the wedge member 19.

The positioning apparatus of the second embodiment is different in operation from that of the first embodiment in the following points.

Since in the released condition given in FIG. 10, pressurized oil has been supplied to the release chamber 35, the piston 22 has been raised. As a result, the drive member 21 has raised the sleeve member 15. Further, the piston 22 has pushed up the advance piston 69, by which the wedge member 19 has been raised via the transmission pin 76. In this condition, the sleeve member 15 is in the previously described non diametrically-expanded condition.

When the pressurized oil is discharged from the release chamber 35 and pressurized oil is supplied to the lock chamber 34 in the released condition, the piston 22 is pushed down and the sleeve member 15 is lowered. The sleeve member 15 attempts to lower the wedge member 19, to which hydraulic pressure acting on the advance piston 69 upward resists. As a result, the sleeve member 15 makes a tapering engagement with the wedge member 19, while pushing down the wedge member 19, diametrically expanding in the second radial direction to come into close contact with the inner peripheral surface of the positioning hole 5 of the work pallet 2.

Further, when the piston 22 is lowered and the wedge member 19 is lowered by a predetermined movable stroke, the transmission pin 76 is in a condition where it is not projected from an upper surface of the flange 9a, and the wedge member 19 is directly received by the flange 9a. Therefore, additional descent of the wedge member 19 (movement to the base end) is prevented, and the sleeve member 15 strongly presses the inner peripheral surface of the positioning hole 5 of the work pallet 2 in the second radial direction D2.

Instead of being driven by pressurized oil, the advance piston 69 may be driven by other pressurized fluid, for example, compressed air.

Additionally, such a construction that the advance piston 69 driven by the above pressurized fluid is used as an advancing means is applicable to any of a third embodiment through a seventh embodiment.

Third Embodiment

Figure 11:
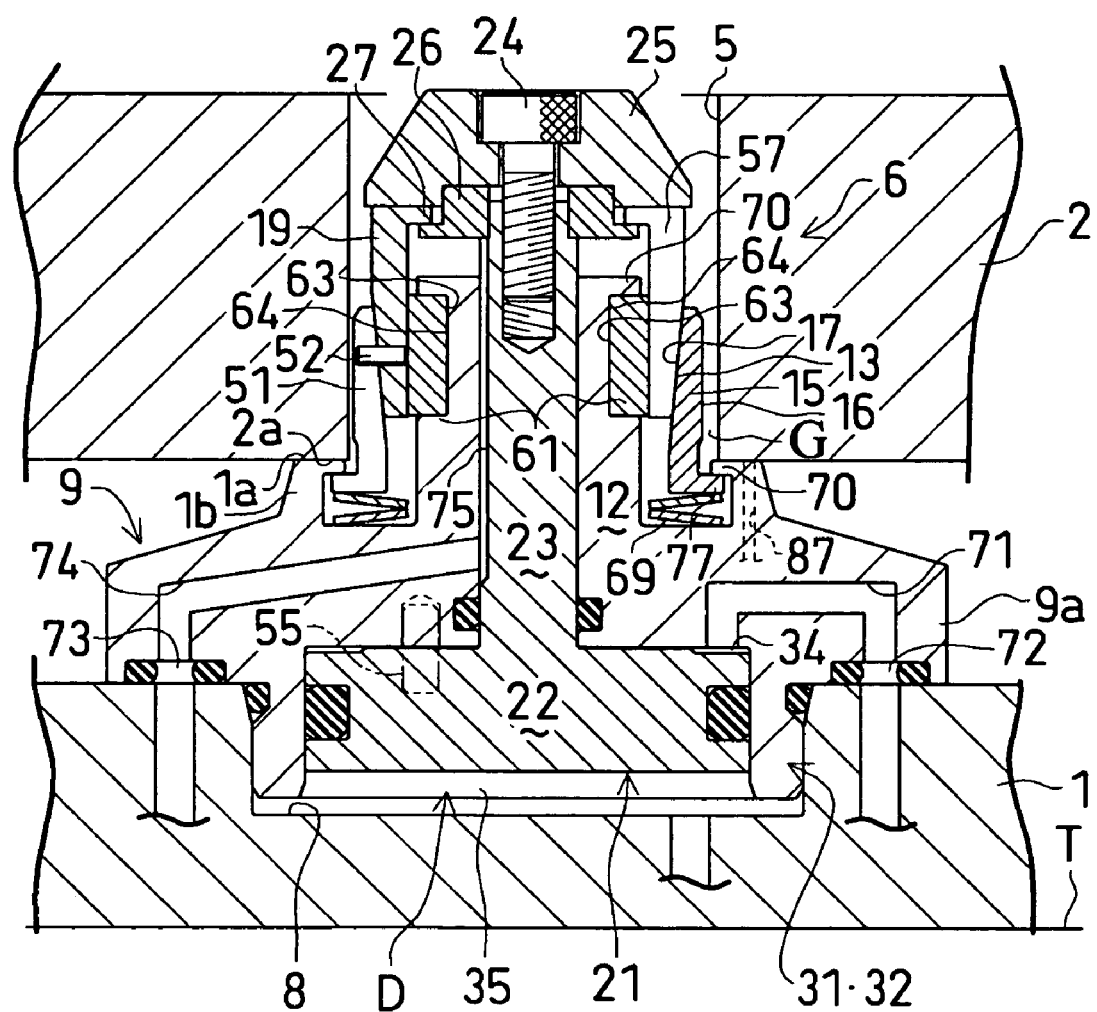
FIG. 11 is a view illustrating a third embodiment of the present invention and similar to FIG. 4.

FIG. 11 is a view illustrating a third embodiment of the positioning apparatus, corresponding to FIG. 4.

The third embodiment is different from the first embodiment in the following points.

As illustrated in FIG. 11, instead of forming a boss on the flange 9a, an upper surface of the flange 9a is projected upward annularly around the base end of the plug member 12, and an upper surface of the annular projection 1b is given as the support surface 1a. In the support surface 1a is opened the nozzle hole 87.

The inclined outer surface 13 of the wedge member 19 (second pressing member) is formed in an inclined manner so as to get closer to the axis of the plug member 12 downward (toward the base end). Corresponding thereto, the inclined inner surface 17 of the sleeve member 15 (first pressing member) is formed in an inclined manner so as to get closer to the axis of the plug member 12 downward (toward the base end).

Between the cap member 25 and the ring 26 is inserted an upper flange 27 of the wedge member 19. Below the sleeve member 15 is arranged a coned disc spring 69, with two sheets superimposed. The coned disc spring 69 urges the sleeve member 15 in an advancing direction. In other words, the coned disc spring 69 exerts force in such a direction as to tighten the tapering engagement of the inclined outer surface 13 with the inclined inner surface 17. Additionally, a flange portion 77 formed at a lower part of the sleeve member 15 is allowed to come into contact with a flange 70 formed at an upper end and in a periphery of the annular projection 1b, thereby preventing advancement of the sleeve, member 15 to an amount exceeding a predetermined amount.

The positioning apparatus of the third embodiment is different in operation from that of the first embodiment in the following points.

In the released condition given in FIG. 11, the wedge member 19 has been kept raised by the piston 22. Further, the sleeve member 15 has been raised by the action of the coned disc spring 69 and has been kept stationary at a position contacting with the flange 70 (at a position corresponding to an advanced end of the movable stroke) or at a position close thereto.

When the wedge member 19 is lowered by the drive member 21 during the locking drive, the wedge member 19 attempts to lower the sleeve member 15, to which the resilient force of the coned disc spring 69 resists. As a result, the inclined outer surface 13 of the wedge member 19 is wedge-engaged with the inclined inner surface 17 of the sleeve member 15. Thereby, the slide portions 61, 61 elastically expand the sleeve member 15 via the wedge member 19 in the second radial direction, allowing the sleeve member 15 to come into close contact with the inner peripheral surface of the positioning hole 5.

As with the first embodiment, the sleeve member 15 is received via the coned disc spring 69 by the housing 9, by which additional descent of the sleeve member 15 (movement to the base end) is prevented. As a result, downward force applied by the drive means D to the wedge member 19 is substantially converted to diametrically expanding force of the sleeve member 15 via the inclined outer surface 13 and the inclined inner surface 17. The sleeve member 15 strongly presses the inner peripheral surface of the positioning hole 5 in the second radial direction.

Fourth Embodiment

Figure 12:
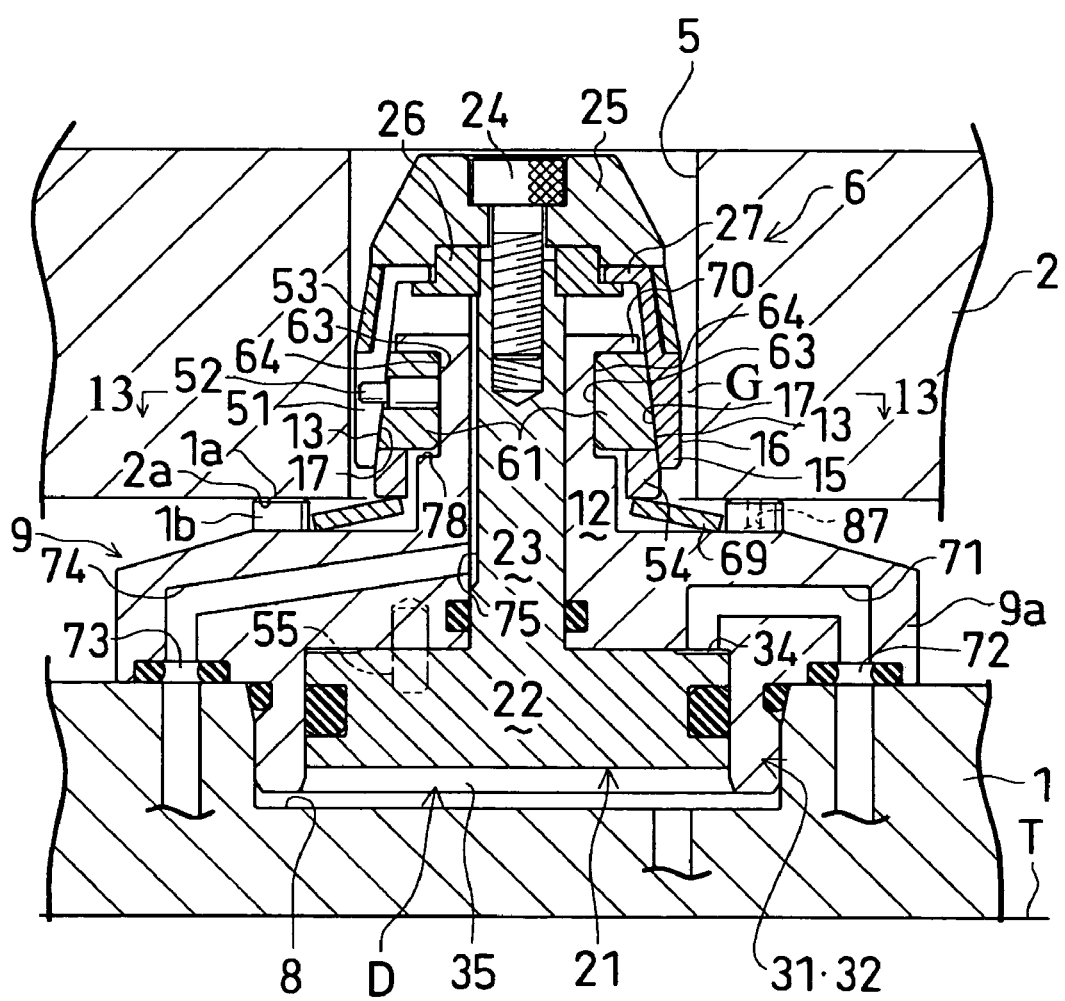
FIG. 12 is a view illustrating a fourth embodiment of the present invention and similar to FIG. 4.
Figure 13:
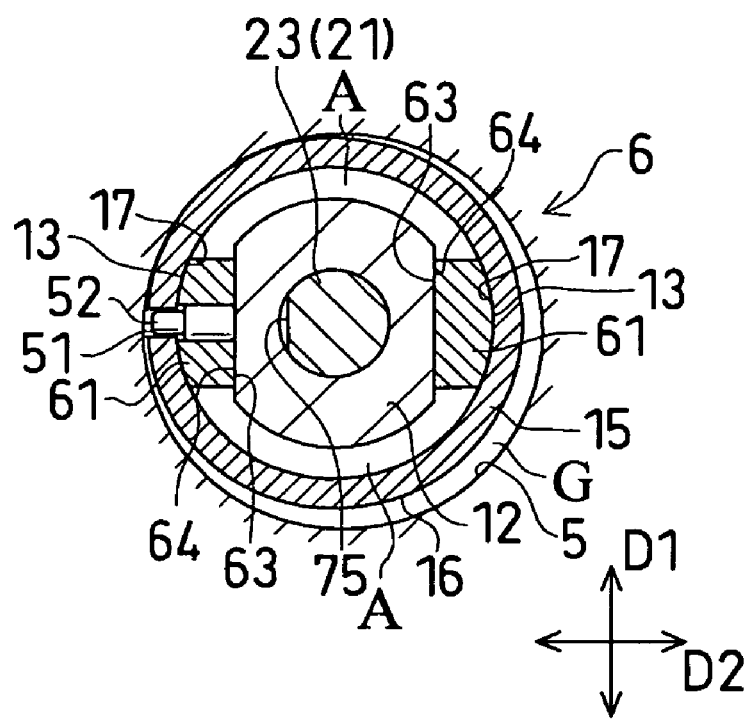
FIG. 13 is a cross sectional view indicated by the arrow 13-13 in FIG. 12.

FIG. 12 and FIG. 13 are views illustrating a fourth embodiment of the present invention.

FIG. 12 is a view corresponding to FIG. 4. FIG. 13 is a cross sectional view indicated by the arrow 13-13 in FIG. 12, corresponding to FIG. 5.

The fourth embodiment is different from the first embodiment in the following points.

The plug means 6 is not provided with the wedge member but, instead, formed with inclined outer surfaces 13, 13 on the slide portions 61, 61. The inclined outer surfaces 13, 13 are formed into a tapered shape so as to get closer to the axis upward (toward the leading end). The inclined outer surface 13 of the slide portions 61 is allowed to be directly in contact with the inclined inner surface 17 of the sleeve member 15 (pressing member).

Outside a lower end portion of the plug member 12 is arranged an annular collar 54 which is formed in a circumferentially seamless manner. The annular collar 54 is fitted into an inner periphery at the lower part of the sleeve member 15 between the coned disc spring 69 to be described later and the slide portion 61. The annular collar 54 is able to prevent intrusion of foreign matter such as swarf derived from metal working inside of the sleeve member 15.

Each of the slide portions 61, 61 is arranged on the plug member 12 along the slide surface 63 in a movable condition in the first radial direction D1.

Further, the slide portions 61 are axially movable by a predetermined stroke with respect to the plug member 12. More specifically, in order to form the slide outer surfaces 64, 64, a vertical dimension of a groove formed in the plug member 12 is made slightly larger than that of the slide portion 61, by which the slide portion 61 is allowed to move vertically inside the groove by the movable stroke to be explained later.

Between the annular collar 54 and the flange 9a is arranged a coned disc spring 69 as an advancing means. The coned disc spring 69 exerts resilient force in such a direction as to make the slide portions 61, 61 advance upward (toward the leading end) via the annular collar 54. In other words, the coned disc spring 69 exerts force in such a direction as to tighten the tapering engagement of the inclined outer surface 13 with the inclined inner surface 17.

Further, ascent of the slide portions 61, 61 larger than a predetermined range is prevented by a flange 70 formed on an outer periphery of the leading end of the plug member 12. Thereby, the limit of the movable stroke of the slide portions 61, 61 at the upper end (leading end) is regulated. A restricting surface 78 for preventing movement of the slide portion 61 to the lower end is formed on a base end portion of the groove. Thereby, the limit of the movable stroke of the slide portions 61, 61 at the lower end (base end) is regulated.

The positioning apparatus of the fourth embodiment is different in operation from that of the first embodiment in the following points.

In the released condition given in FIG. 12 and FIG. 13, the sleeve member 15 has been kept raised by the piston 22. The slide portions 61, 61 has been raised by the action of the coned disc spring 69 and has been kept stationary at a position contacting with the flange 70 (at a position corresponding to an advanced end of the movable stroke) or at a position close thereto.

When the sleeve member 15 is lowered by the drive member 21 during the locking drive, the sleeve member 15 attempts to lower the slide portions 61, 61, to which resilient force of the coned disc spring 69 resists. As a result, the inclined inner surface 17 of the sleeve member 15 is wedge-engaged with the inclined outer surface 13 of the slide portions 61, 61. Thereby, the sleeve member 15 elastically expands diametrically in the second radial direction D2, coming into close contact with the inner peripheral surface of the positioning hole 5. Then, regarding positional misalignment of the positioning hole 5 with respect to the plug member 12, the positional misalignment in the second radial direction D2 is corrected.

Further, the slide portions 61, 61 is movable along the slide surfaces 63, 63 in the first radial direction D1, thereby the sleeve member 15 is allowed to move to some extent toward the first radial direction D1, together with the slide portions 61, 61 by the component force of the first radial direction D1 of reaction force applied from the inner peripheral surface of the positioning hole 5, when the sleeve member 15 comes into close contact with the inner peripheral surface of the positioning hole 5. Therefore, regarding positional misalignment of the positioning hole 5 with respect to the plug member 12, the positional misalignment in the first radial direction D1 is allowed.

Thereafter, when the slide portions 61, 61 are lowered to a predetermined amount and kept in contact with the restricting surface 78, the slide portions 61, 61 are received by the plug member 12 (the housing 9), thereby preventing additional descent of the slide portions 61, 61 (movement to the base end). As a result, descending force applied by the drive means D to the sleeve member 15 is substantially converted to diametrically expanding force of the sleeve member 15 by the inclined outer surface 13 and the inclined inner surface 17. The sleeve member 15 strongly presses the inner peripheral surface of the positioning hole 5 in the second radial direction D2.

In the present embodiment, a wedge member necessary in the first embodiment through the third embodiment can be omitted to provide a simple construction.

A pair of the slide portions 61, 61 and the annular collar 54 may be formed integrally, instead of being formed separately.

Further, a pair of the slide portions 61, 61 may be connected via a thin member (not illustrated) extending along the gaps A, A or formed integrally with the thin member.

The above exemplary variations are applicable to individual embodiments to be described later.

Fifth Embodiment

Figure 14:
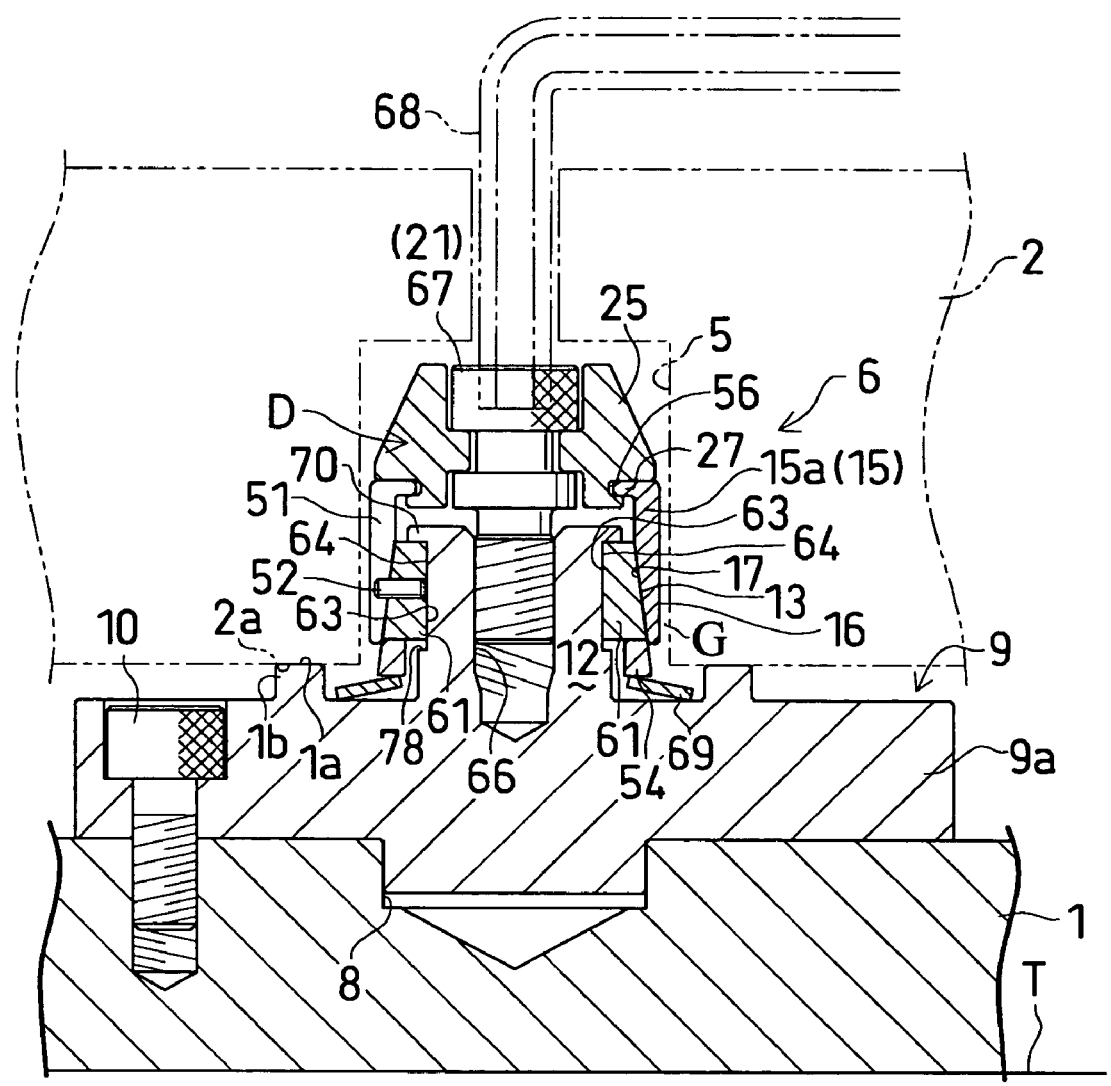
FIG. 14 is a view illustrating a fifth embodiment of the present invention and similar to FIG. 4.

FIG. 14 is a view illustrating a fifth embodiment of the present invention, corresponding to FIG. 4.

The fifth embodiment is given as an exemplary variation of the fourth embodiment. As illustrated in FIG. 14, no boss is projected on the base plate 1, instead, an upper surface of the flange 9a on the housing 9 is annularly projected to construct the support surface 1a on an upper end surface of the annular projection 1b.

Into a screw hole 66 opened in the upper end surface of the plug member 12 is screwed a lower part of a flanged bolt 67. In a head of the flanged bolt 67 is opened a hexagonal hole (not illustrated), and a hexagon wrench 68 is allowed to be engaged with the hole as illustrated by the chain line. Between the head of the flanged bolt 67 and the flange portion is supported the cap member 25 relatively rotatably and vertically unmovably. Into a engaging recess 56 formed at the lower part of the cap member 25 is fitted an upper flange 27 of the sleeve member 15.

In the present embodiment, the flanged bolt 67 corresponds to the drive member 21. Further, the drive means D is constructed with the screw hole 66 and the hexagon wrench 68.

In the above described construction, when the hexagon wrench 68 is inserted into the head of the flanged bolt 67 to turn the head, the flanged bolt 67 is screwed into a vertical direction. Thereby, the sleeve member 15 is moved downward for locking or moved upward for releasing. As a result, the sleeve member 15 diametrically expands or contracts by a tapering engagement with the inclined outer surfaces 13, 13, which are outer surfaces of the slide portions 61, 61. Other constructions and operations are similar to those described in the fourth embodiment.

Such a construction that a screw member such as a bolt 67 is used as a drive member as described in the present embodiment is applicable to other embodiments as well illustrated in the present specification.

Sixth Embodiment

FIG. 15 through FIG. 18 are views illustrating a sixth embodiment of the present invention.

Figure 15:
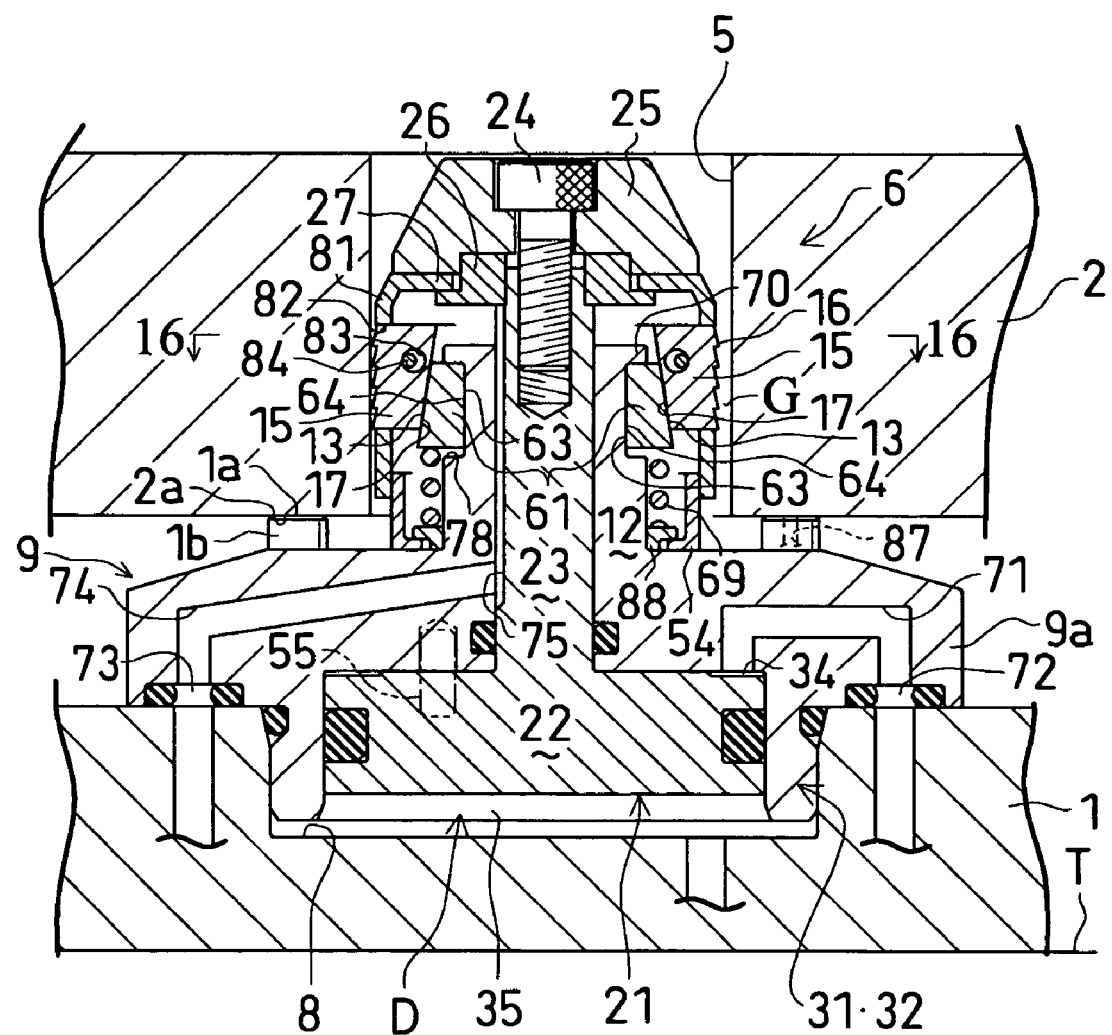
FIG. 15 is a view illustrating a sixth embodiment of the present invention and similar to FIG. 4.
Figure 16:
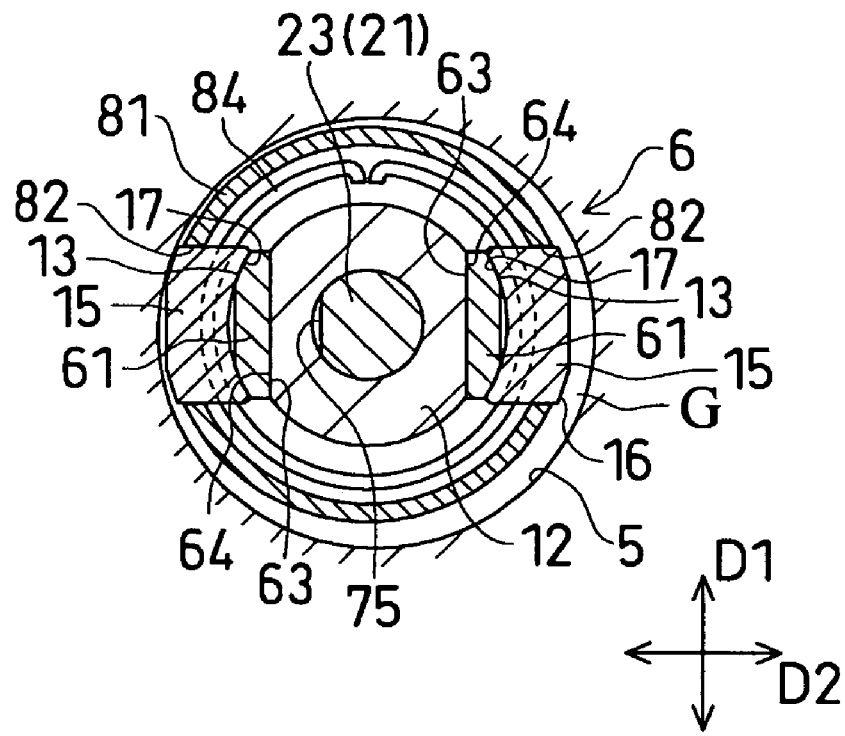
FIG. 16 is a cross sectional view indicated by the arrow 16-16 in FIG. 15.
Figure 17:
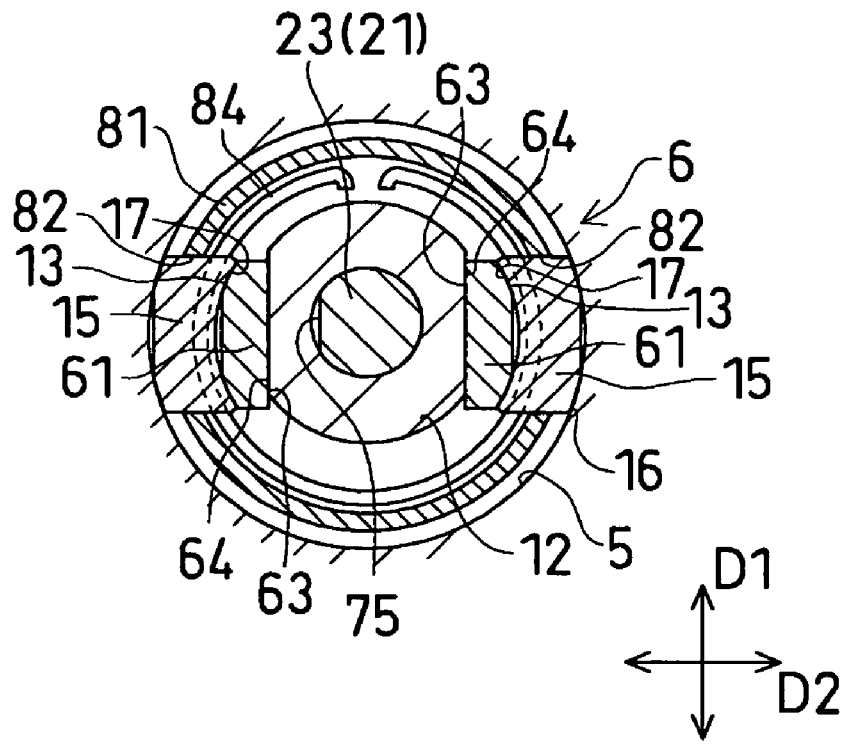
FIG. 17 is a cross sectional view illustrating a state that the engaging member illustrated in FIG. 16 is in close contact with an inner peripheral surface of the positioning hole.
Figure 18:
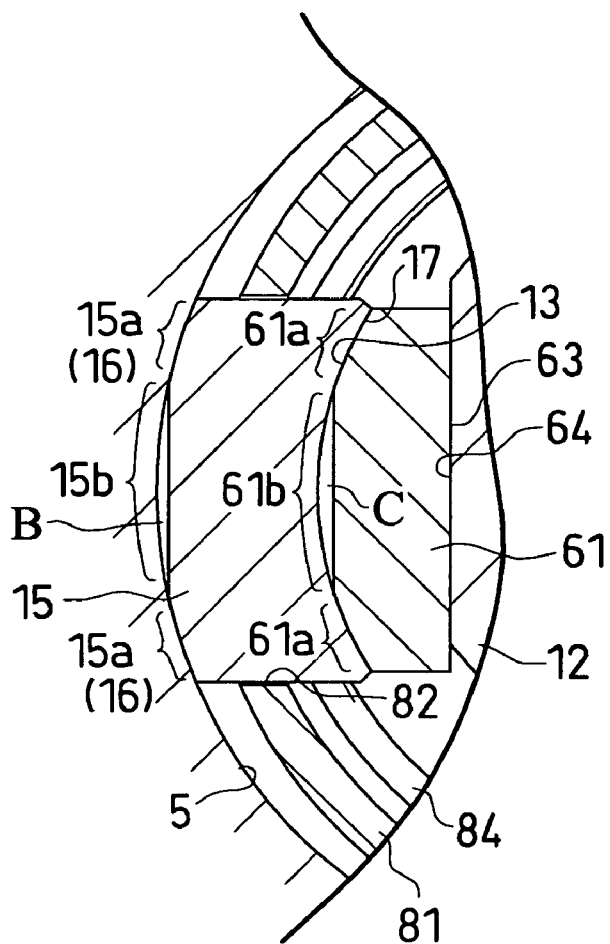
FIG. 18 is an enlarged view illustrating major parts of FIG. 17.

FIG. 15 is a view corresponding to FIG. 4. FIG. 16 is a cross sectional view indicated by the arrow 16-16 in FIG. 15. FIG. 17 is a cross sectional view illustrating a state that the engaging member 15 undergoes displacement in a diametrically expending direction to come into close contact with the inner peripheral surface of the positioning hole 5. FIG. 18 is an enlarged view illustrating major parts of FIG. 17.

The sixth embodiment is given as an exemplary variation of the fourth embodiment (FIG. 12 and FIG. 13).

With a groove formed between the cap member 25 and the ring 26 is engaged an upper flange 27 of a cylindrical connecting member 81. On a cylindrical wall of the connecting member 81 is formed a support window 82 which opposes the inclined outer surface 13 of the slide portion 61. Into the support windows 82, 82 are fitted a pair of the engaging members 15, 15 (pressing members) which is constructed into a block shape radially movably.

These engaging members 15, 15 are arranged to oppose each other in a radial direction so as to hold both the slide portions 61, 61 therebetween. Further, on each of the engaging members 15, 15 is formed an inclined inner surface 17, and the inclined inner surface 17 is allowed to make a tapering engagement with the inclined outer surface 13 of the slide portion 61. Both the inclined outer surface 13 and the inclined inner surface 17 are formed into tapered surfaces so as to get closer to the axis toward the leading end.

On each engaging member 15 is formed a straight outer surface 16. In this embodiment, fine serrate irregularities are formed on the straight outer surface 16, as illustrated in FIG. 15. When the engaging member 15 is brought into close contact with the inner peripheral surface of the positioning hole 5 on the work pallet 2, the irregularities provide a large friction to strongly lower the work pallet 2 via the engaging members 15, 15. However, as with other embodiments, the straight outer surfaces 16, 16 may be formed into a flat surface.

A through hole 83 is circumferentially formed in each of the engaging members 15, 15. A ring spring 84 (returning member) arranged on an outer periphery of the plug member 12 is inserted into the through hole 83. The ring spring 84 applies resilient force to the engaging members 15,15 in a diametrically contracting direction.

Into a lower end portion of the plug member 12 is fitted an annular spring support 88. Between the spring support 88 and the slide portions 61, 61 is attached a compression coil spring 69 (advancing means). The compression coil spring 69 urges the slide portions 61, 61 upward (toward the leading end).

Outside the spring support 88 is arranged an annular collar 54 which is formed in a circumferentially seamless manner. The annular collar 54 is fitted into an inner periphery of a lower portion of the connecting member 81. The annular collar 54 is able to prevent intrusion of foreign matter such as swarf derived from metal working inside of the connecting member 81.

Between the upper flange 27 of the connecting member 81 and the ring 26 is formed an annular gap. Also between the annular collar 54 and the spring support 88 is formed an annular gap. These annular gaps allow the connecting member 81 to move in a radial direction.

In the released condition illustrated in FIG. 15 and FIG. 16, the connecting member 81 has been raised by the drive member 21, and the engaging members 15, 15 have also been raised. Further, the slide portions 61, 61 have also been raised by the action of the compression coil spring 69. In the released condition, the engaging members 15, 15 are pulled in a diametrically contracting direction by the ring spring 84 and kept in a condition that they are hardly projected from an outer surface of the connecting member 81 (non diametrically-expanded condition).

When the pressurized oil is discharged from the release chamber 35 and pressurized oil is supplied to the lock chamber 34 in the released condition, the drive member 21 is driven downward. Along with descent of the drive member 21, the connecting member 81 is moved downward, thereby lowering the engaging members 15, 15 connected to the connecting member 81 (lock movement).

As a result, the engaging members 15, 15 make a tapering engagement with the slide portions 61, 61 kept at an raised position by the resilient force of the compression coil spring 69, thereby undergoing displacement in a diametrically expanding direction (in the second radial direction D2), while allowing the ring spring 84 to undergo an elastic deformation, thereby projecting from the connecting member 81. Then, as illustrated in FIG. 17, the straight outer surfaces 16, 16 of the engaging members 15, 15 come into close contact with the inner peripheral surface of the positioning hole 5. It follows that the closely contacted engaging members 15, 15 strongly lower the work pallet 2.

In the sixth embodiment, a construction is provided that the engaging members 15, 15 formed into a block shape diametrically expand to undergo displacement in the second radial direction D2, allowing the straight outer surface 16 to come into close contact with the inner peripheral surface of the positioning hole 5, thereby allowing diametrically expanding force to act upon. Therefore, regarding positional misalignment of the positioning hole 5 with respect to the plug member 12 (positional misalignment illustrated in FIG. 16), the positional misalignment in the second radial direction D2 is corrected by the close contact. On the other hand, the slide portions 61, 61 are movable in the first radial direction D1, along the slide surface 63 and the slide outer surface 64. Thus, as illustrated in FIG. 17, the engaging members 15, 15 are allowed to move to some extent toward the first radial direction D1, together with the connecting member 81 and the slide portions 61, 61 by the component force of the first radial direction D1 of reaction force applied from the inner peripheral surface of the positioning hole 5, when the positioning hole 5 is pressed. Therefore, regarding positional misalignment of the positioning hole 5 with respect to the plug member 12, the positional misalignment in the first radial direction D1 is allowed.

In the present embodiment, a construction is provided that the engaging members 15, 15 which undergo displacement in a diametrically expanding direction come into close contact with the inner peripheral surface of the positioning hole 5. Therefore, the engaging members 15, 15 are allowed to be displaced in a larger amount, as compared with the previously described first embodiments through the fifth embodiments where the annular sleeve member is deformed and brought into close contact with the inner peripheral surface of the positioning hole 5. As a result, the fitting gap (gap G illustrated in FIG. 16) in the non diametrically-expanded condition is made larger and the engaging member 15 can be inserted into the positioning hole 5 more smoothly.

FIG. 18 is an enlarged view illustrating one of the two pairs composed of the engaging members 15 and the slide portions 61 given in FIG. 17. As illustrated in FIG. 18, on outer surfaces of each of the engaging members 15, 15 are formed two contact portions 15a, 15a and an escape portion 15b arranged between these two contact portions circumferentially side by side. The contact portions 15a, 15a (corresponding to the straight outer surfaces 16, 16) are formed into an arc surface and adapted to be in contact with the inner peripheral surface of the positioning hole 5. Further, the escape portion 15b is formed into a flat surface. Then, when the contact portions 15a, 15a come into contact with the inner peripheral surface of the positioning hole 5, a gap B is formed between the escape portion 15b and the inner peripheral surface of the positioning hole 5.

As constructed as described above, positioning can be appropriately conducted even in a case where the positioning hole 5 has a larger inner diameter and the engaging members 15, 15 are required to undergo a larger displacement so as to come into close contact with the inner peripheral surface of the positioning hole 5. Namely, the construction is that the inner peripheral surface of the positioning hole 5 is pushed at two contact portions 15a, 15a each for the engaging members 15, 15 totaling four contact portions, however, not pushed at the escape portion 15b. Therefore, the engaging member 15 applies diametrically expanding force (force in the second radial direction D2) at the four points of the contact portions 15a, thereby making it possible to correct appropriately and reliably the positional misalignment in the second radial direction D2 occurring between the positioning hole 5 and the plug member 12.

Further, on outer surfaces of each of the slide portions 61 are formed two contact portions 61a, 61a and an escape portion 61b arranged between these two contact portions circumferentially side by side. The contact portions 61a, 61a are formed into a conical surface so as to come into contact with the inner surface of the engaging member 15. In addition, the escape portion 61b is formed into a flat surface, and between the escape portion 61b and the inner surface of the engaging member 15 is formed a gap C. Therefore, a construction is possible that two contact portions 61a, 61a for each of the slide portions 61, 61 totaling four contact portions are in contact with the inner surface of the engaging member 15 and during the lock movement as described above, the engaging member 15 is allowed to receive the reaction force applied from the inner peripheral surface of the positioning hole 5 at these four points stably. Thus, the positional misalignment of the positioning hole 5 with respect to the plug member 12 in the second radial direction D2 is allowed to be appropriately and reliably corrected.

Further, the escape portion 61b is not limited to being formed on the outer surface of the slide portion 61. For example, the escape portion may be formed by forming the outer surface of the slide portion 61 into a conical surface across the entire circumferential direction and recessing a central part of the inner surface of the engaging member 15 circumferentially into a V shape.

In addition, in the present embodiment, the cylindrical connecting member 81 is arranged around the outer periphery of the plug member 12 and the engaging member 15 is supported on the support window 82 of the connecting member 81 movably in the second radial direction D2. Therefore, such a simple construction is provided that supports the engaging members 15, 15 formed into a block shape. In the present embodiment, since the connecting member 81 is connected to the drive member 21, the connecting member 81 is allowed to be driven by the drive means D. As a result, the engaging members 15, 15 are allowed to be moved for locking and releasing easily by moving the connecting member 81 upwardly and downwardly. In addition, the connecting member 81 is formed into a cylindrical shape, thereby a construction can be provided that intrusion of foreign matter inside the connecting member 81 is made difficult.

In addition, the present embodiment is provided with a ring spring 84 which acts resilient force in a diametrically contracting direction upon the engaging members 15, 15. Therefore, during the releasing movement, the engaging members 15, 15 formed into a block shape can easily return to the non diametrically-expanded condition. It is noted that the ring spring 84 is not limited to a metal spring but may be replaced by an elastic material such as rubber.

The return means for the engaging member 15 is provided by connecting the engaging member 15 with the slide portion 61 with a T-shaped fitting structure, when viewed from above.

Further, such a structure that the engaging member 15 is supported on the connecting member 81 is applicable to the first embodiment and others. More specifically, instead of the sleeve member 15 in the first embodiment (FIG. 2), the connecting member 81 and the engaging members 15, 15 in the present embodiment may be arranged outside the wedge member 19 (FIG. 2).

In embodiments other than the present embodiments which are disclosed in the present specification, it is possible to form serrate irregularities on the outer surface of the straight outer surface 16. Further, the irregularities on the straight outer surface 16 are not limited to a serrate shape but may be available in various shapes.

Seventh Embodiment

Figure 19:
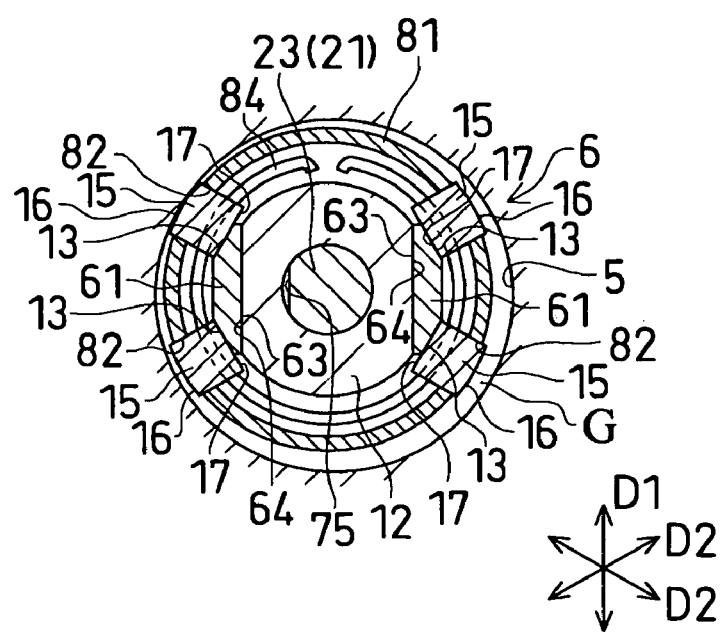
FIG. 19 is a view illustrating a seventh embodiment of the present invention and similar to FIG. 16.

FIG. 19 is a transverse cross sectional view illustrating the positioning apparatus of a seventh embodiment and similar to FIG. 16.

The seventh embodiment is given as an exemplary variation of the sixth embodiment. As illustrated in FIG. 19, two pairs of the engaging members 15 are provided so as to oppose each other in a radial direction across the slide portions 61,61. In the connecting member 81 are opened four support windows 82 for supporting four engaging members 15.

As illustrated in FIG. 19, a direction at which each pair of the engaging members 15, 15 oppose each other (direction at which the engaging members 15, 15 are projected during the locking movement, namely, equivalent to the second radial direction D2) is not perpendicular to the first radial direction D1 but inclined. Further, a direction D2 at which one pair of the engaging members 15, 15 oppose each other and a direction D2 at which the other pair of the engaging members 15, 15 oppose each other are symmetrical with respect to a line perpendicular to the first radial direction D1.

A pair of inclined outer surfaces 13, 13 are provided at each of the slide portions 61, 61 circumferentially and bilaterally. The inclined outer surfaces 13, 13 are not formed into a conical surface but formed into an inclined flat surface so as to get closer to the axis toward the leading end. Outside each of the inclined outer surfaces 13, 13 is arranged the engaging member 15. The inner surface (the inclined inner surface 17) of the engaging member 15 is not formed into a conical surface but formed into an inclined flat surface so as to get closer to the axis toward the leading end. When viewed from above as illustrated in FIG. 19, the inclined outer surface 13 and the inclined inner surface 17 are perpendicular to the second radial direction D2 and slightly inclined to the first radial direction D1.

In the seventh embodiment, the connecting member 81 is lowered via the drive member 21, by which each of the engaging members 15, 15 moves downward for locking, and the engaging member 15 diametrically expands in the second radial direction D2 by the tapering engagement of the inclined outer surface 13 with the inclined inner surface 17, and the engaging member 15 comes into close contact with the inner peripheral surface of the positioning hole 5. As a result, the positional misalignment in the second radial direction D2, D2 is corrected.

As described previously, the direction D2 at which one pair of the engaging members 15, 15 oppose each other and the direction D2 at which the other pair of the engaging members 15, 15 oppose each other are symmetrical with respect to the line perpendicular to the first radial direction D1. Therefore, positional misalignment perpendicular to the first radial direction D1 is corrected by the locking movement. Further, positional misalignment in the first radial direction D1 is also allowed, as with the sixth embodiment.

In the seventh embodiment, the outer surface of each of the engaging members 15, 15 is formed into a simple arc surface (straight outer surface 16) and the escape portion which is provided in the sixth embodiment is not provided. The reason thereof is that, in the present embodiment, four engaging members 15 are simultaneously projected in the second radial direction D2, thereby applying diametrically expanding force to the inner peripheral surface of the positioning hole 5 of the work pallet 2 at four points in the direction perpendicular to the first radial direction D1, making it possible to correct positional misalignment perpendicular to the first radial direction D1. Other constructions and operations are similar to those described in the sixth embodiment.

It is noted that the engaging member 15 may be provided in three pairs or more, instead of two pairs.

Modified Embodiment

The positioning apparatus described in the first embodiment through the seventh embodiment may be changed as follows.

(1) The plug member 12 and the housing 9 may be formed separately, instead of being formed integrally. In this case, the plug member 12 may be firmly fixed to the housing 9 by using bolts, screws and the like.

(2) Further, the housing 9 and the base plate 1 may be formed integrally, instead of being formed separately.

(3) The slide surfaces 63, 63 and the slide outer surfaces (inclined outer surfaces) 64, 64 may be formed in an inclined manner with respect to the first radial direction D1, instead of being formed in a parallel manner with respect to the first radial direction D1.

(4) The slide portions 61, 61 may be provided in two or more pairs of them, in addition to being provided in one pair of them.

(5) The support surface 1a may be formed directly on a flat upper surface of the housing 9, instead of being formed at the boss 1b of the housing 9. Further, the support surface 1a may also be formed on a boss projected from the base plate 1 upward.

[Clamping System]

Hereinafter, an explanation will be made for a first example applied to the clamping system of the positioning apparatus by referring to FIG. 20.

Figure 20:
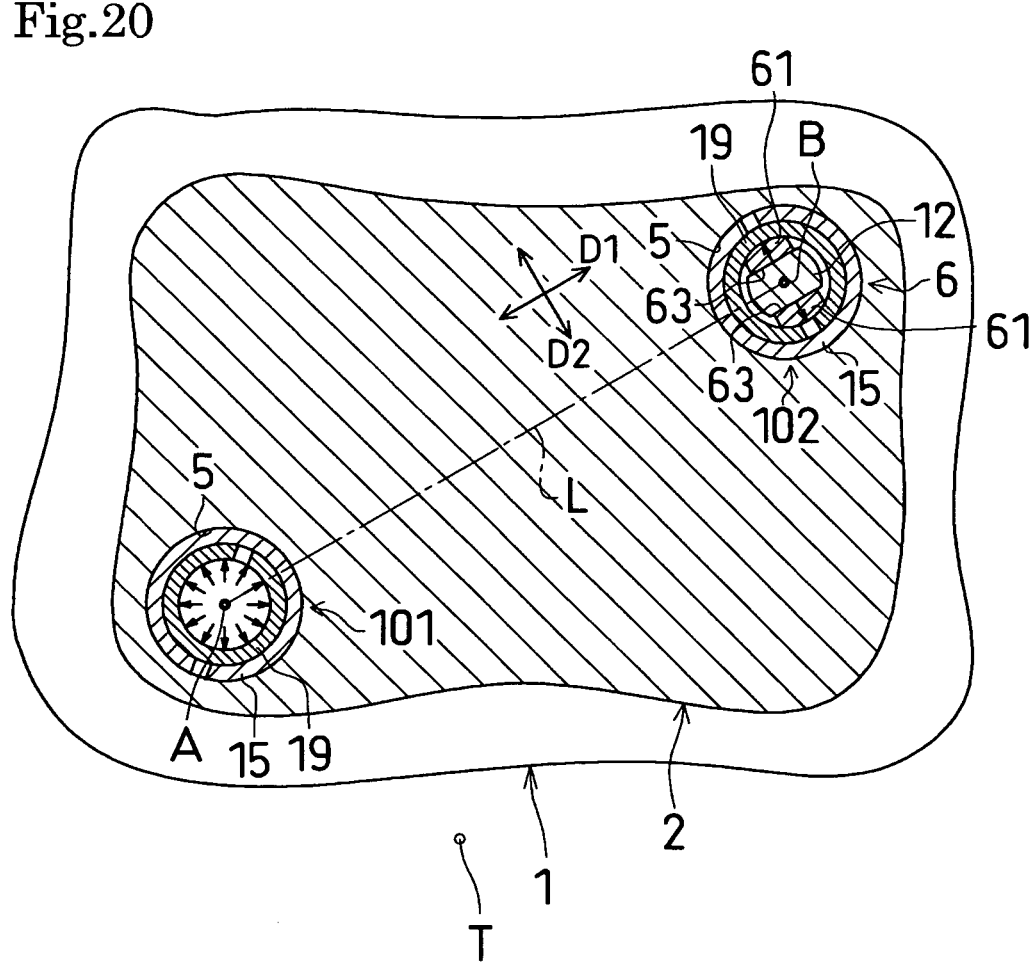
FIG. 20 is a schematic plan view illustrating a first example of the clamping system.

FIG. 20 is a schematic plan view of a clamping system.

As illustrated in FIG. 20, on an upper surface of a table T of a machining center is fixed the base plate 1. The work pallet 2 is allowed to be attached to or detached from the base plate 1 via the clamping system of the present invention. The clamping system is provided with a first positioning apparatus 101 and a second positioning apparatus 102.

The work pallet 2 is available in a plural number (only one piece is illustrated in FIG. 20) and may be exchanged and attached to the base plate 1, whenever necessary. When the work pallet 2 is attached to the base plate 1, the work pallet 2 is positioned and fixed by the two positioning apparatuses 101, 102.

The first positioning apparatus 101 is provided with a sleeve member 15 which is inserted into the inner peripheral surface of the positioning hole 5 opened in the work pallet 2, and the sleeve member 15 is allowed to come into close contact with the inner peripheral surface of the positioning hole 5 by acting diametrically expanding force over substantially the whole periphery of the sleeve member 15 and the work pallet 2 is positioned horizontally with respect to the base plate 1 via the sleeve member 15. More specifically, the sleeve member 15 is positioned so as to make an axis of the positioning hole 5 coincide with an axis A of the first positioning apparatus 101. It follows that the closely contacted sleeve member 15 is driven downward to fix the work pallet 2 to the base plate 1.

It is noted that the first positioning apparatus 101 may be available in various specific constructions. It is structurally available that, in the positioning apparatus of the first embodiment, both the slide outer surfaces 64, 64 and the slide portions 61, 61 are not provided but the wedge member 19 is arranged so as to come into close contact with over an entire outer peripheral surface of the plug member 12 (so as to be free of the gaps A, A) and the inclined inner surface 17 of the sleeve member 15 is allowed to make a tapering engagement with the inclined outer surface 13 of the wedge member 19.

Further, the positioning apparatus (refer to FIG. 1 and FIG. 2) of the first embodiment is employed as the second positioning apparatus 102. The slide portions 61, 61 are arranged so as to oppose each other in a direction substantially orthogonal to a line L connecting an axis A of the positioning apparatus 101 with an axis B of the positioning apparatus 102. In other words, the slide portions 61, 61 are arranged so that the second radial direction D2 is substantially orthogonal to the line L. Therefore, diametrically expanding force acts on the sleeve member 15 in the direction at which the slide portions 61, 61 oppose each other (the second radial direction D2), by which rotation of the work pallet 2 around the axis A is prevented. In this case, the sleeve member 15 moves together with the wedge member 19 and the slide portions 61, 61 along the slide surfaces 63, 63 (the first radial direction D1), thereby radial misalignment with respect to the axis A is absorbed. It follows that the closely contacted sleeve member 15 is driven downward to fix the work pallet 2 to the base plate 1.

Since the positioning apparatus of the first embodiment is employed as the second positioning apparatus 102 in the present clamping system, positioning with high accuracy can be conducted. Further, when the work pallet 2 and the base plate 1 are attached or detached, a condition in which the fitting gap G (illustrated in FIG. 4 and FIG. 5) is formed between the inner peripheral surface of the positioning hole 5 and the straight outer surface 16 in the second positioning apparatus 102 can be obtained. Thereby, workability is improved upon attachment and detachment. Further, during the locking movement, in the second positioning apparatus 102, the work pallet 2 can approach the base plate 1 via the sleeve member 15, thereby making it possible to omit an exclusive clamping means, whenever necessary.

In addition, by employing the positioning apparatus of the first embodiment as at least one of these positioning apparatuses 101, 102, a clamping system capable of positioning in various modes can be provided, as explained in the present clamping system.

Figure 21:
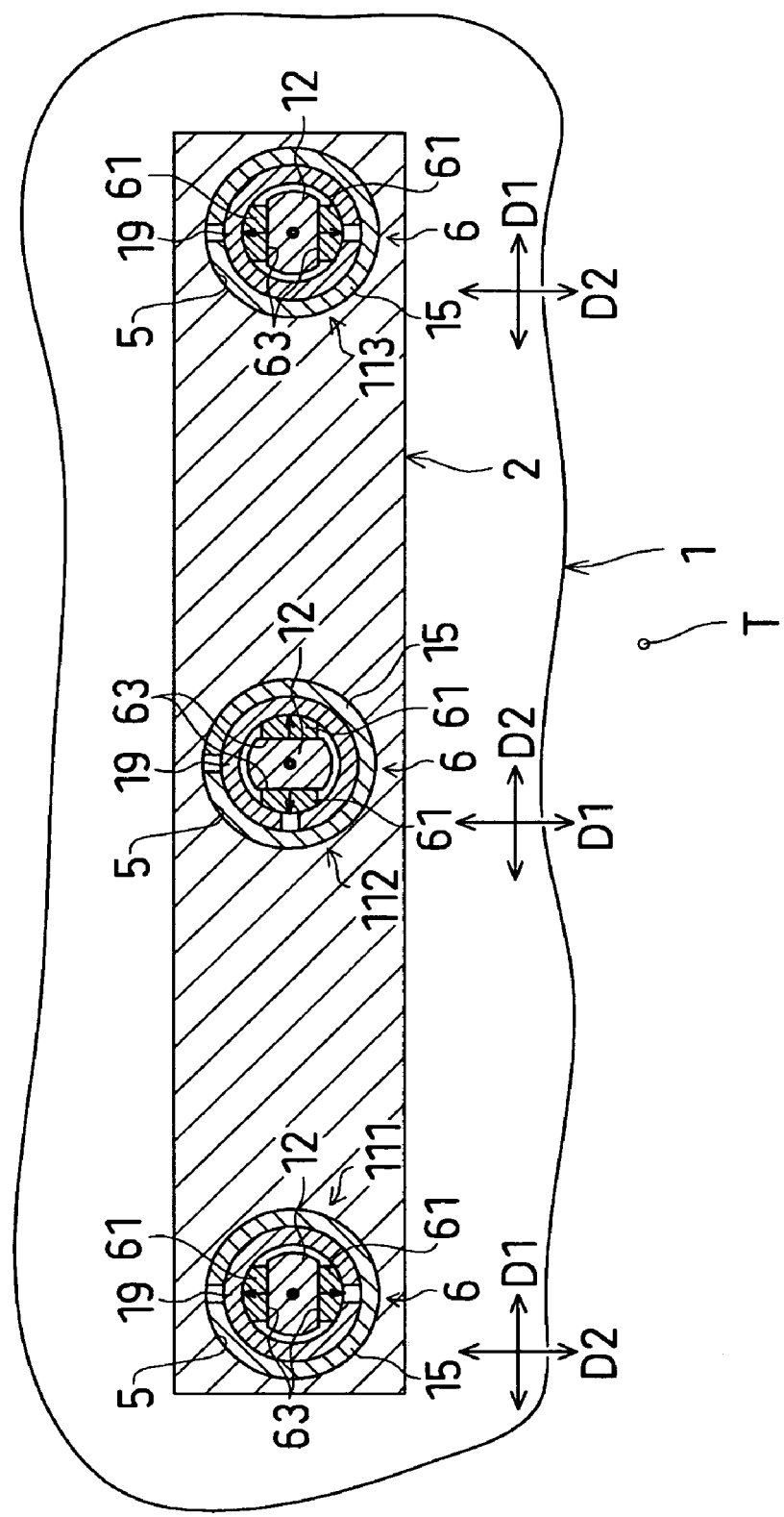
FIG. 21 is a schematic plan view illustrating a second example of the clamping system.

FIG. 21 is a schematic plan view illustrating a second example applied to the clamping system of the above-described positioning apparatus. The second example is constructed as a preferable example for fixing a long work pallet 2 to the base plate 1. As illustrated in FIG. 21, in the second example, three positioning apparatuses 111 through 113 of the first embodiment are provided side by side in a longitudinal direction of the work pallet 2.

In the middle positioning apparatus 112, a direction to which the slide portions 61, 61 are opposed is along the longitudinal direction of the work pallet 2. In the positioning apparatus 112, the work pallet 2 is positioned with respect to the longitudinal direction.

Further, in the positioning apparatuses 111, 113 arranged at both ends, a direction to which the slide portions 61, 61 are opposed is substantially perpendicular to the longitudinal direction of the work pallet 2. These positioning apparatuses 111, 113 are employed for positioning with respect to the direction perpendicular to the longitudinal direction of the work pallet 2, also for blocking rotation of the work pallet 2 around the axis of the middle positioning apparatus 112.

[Modified Examples of the Clamping System]

The above-described clamping system can be changed as follows.

(1) The first example given in FIG. 20 is not limited to a construction in which the positioning apparatus of the first embodiment is employed as the second positioning apparatus 102, however, for example, the positioning apparatus described in the second embodiment through the seventh embodiment may be employed. In the second example given in FIG. 21, the positioning apparatus described in the second embodiment through the seventh embodiment may be employed instead of the positioning apparatus of the first embodiment.

(2) In addition to the above-described positioning apparatuses 101, 102, an exclusive clamping means capable of pressing the supported surface 2a of the work pallet 2 against the support surface 1a of the base plate 1 may be provided in the first example in FIG. 20. This construction is also applicable to the second example in FIG. 21.

(3) The combination of the first block and the second block may be a combination of a table of a machine tool and a work pallet, a- combination of a work pallet and a jig base, a combination of a jig base and a work piece, or a combination of a working jig such as a welding jig and a working article such as a work piece, instead of the exemplified combination of the base plate 1 and the work pallet 2. Further, the combination may be a set of a board of an injection molding machine or of a pressing machine and a mold. In addition, the present invention is applicable to positioning of a work piece, a tool and the like used in various processing machines such as a laser beam machine and an electric discharge machine.

What is claimed is:

1. A positioning apparatus, comprising:
    a plug member having a longitudinal axis projecting from a first block and adapted for insertion into a positioning hole formed in a second block and having a plurality of slide outer surfaces formed on an outer periphery thereof,
    a plurality of slide portions opposed to each other across the plug member in an opposed direction arranged around the plug member and having slide inner surfaces which together with said slide outer surfaces are formed into substantially vertical flat surfaces parallel to said longitudinal axis for movement relative to said slide outer surfaces in a first radial direction substantially orthogonal to the opposed direction thereof,
    a first pressing member diametrically expandably and diametrically contractibly and axially movably within a predetermined range arranged outside the slide portions,
    a second pressing member diametrically expandably and diametrically contractibly and axially movably within a predetermined range arranged outside the slide portions and inside the first pressing member,
    wherein the first pressing member is arranged to be driven toward the first block by a drive arrangement, such that the slide portions expand the first pressing member in said opposed direction which defines a second radial direction different from the first radial direction, and such that the slide portions are moved in the first radial direction with respect to the plug member.

2. The positioning apparatus as set forth in claim 1, including an inclined outer surface formed on the second pressing member, an inclined inner surface enabling a tapering engagement with the inclined outer surface formed on the first pressing member, an axially movable drive member arranged to be inserted into the plug member, said drive member connected to the first pressing member, said drive member being arranged to move the first pressing member toward the first block for locking to expand the first pressing member in the second radial direction by the tapering engagement and to bring the first pressing member into close contact with an inner peripheral surface of the positioning hole, and said drive member being also arranged to move the first pressing member toward a leading end for releasing the diametrically expanded condition of the first pressing member and thus releasing the closely contacted condition.

3. The positioning apparatus as set forth in claim 1, including an advancing arrangement configured to advance the first pressing member or the second pressing member toward a leading end.

4. The positioning apparatus as set forth in claim 1, wherein the first pressing member is formed in an annular shape.

5. The positioning apparatus as set forth in claim 4, wherein a slit is formed in the first pressing member, said slit enabling the first pressing member to deform in a diametrically expanding direction and a diametrically contracting direction.

6. The positioning apparatus as set forth in claim 1, wherein the second pressing member is formed in an annular shape.

7. The positioning apparatus as set forth in claim 6, including a slit formed in the second pressing member, said slit enabling the second pressing member to deform in a diametrically expanding direction and a diametrically contracting direction.

8. The positioning apparatus as set forth in claim 6, including gaps disposed between the second pressing member and the plug member in the first radial direction.

9. The positioning apparatus as set forth in claim 1, wherein the drive arrangement is configured to move the second block toward a base end via the first pressing member such that the first pressing member comes into close contact with an inner peripheral surface of the positioning hole, and presses a supported surface of the second block against a support surface of the first block.

10. A clamping system, comprising the positioning apparatus as set forth in claim 1.

11. A clamping system, comprising a plurality of positioning apparatuses, wherein at least one of which is a positioning apparatus as set forth in claim 1.

* * * * *